(12) United States Patent
Eisenman et al.

(10) Patent No.: US 6,840,645 B2
(45) Date of Patent: Jan. 11, 2005

(54) LIGHT TUBE SYSTEM FOR DISTRIBUTING SUNLIGHT OR ARTIFICIAL LIGHT SINGLY OR IN COMBINATION

(75) Inventors: James A. Eisenman, Laurel Hollow, NY (US); Walter A. Johanson, 250 E. 5th St., St. Paul, MN (US) 55101

(73) Assignee: Walter A. Johanson, St. Paul, MN (US)

( * ) Notice: Subject to any disclaimer, the term of this patent is extended or adjusted under 35 U.S.C. 154(b) by 0 days.

(21) Appl. No.: 09/917,336

(22) Filed: Jul. 27, 2001

(65) Prior Publication Data

US 2002/0085393 A1 Jul. 4, 2002

Related U.S. Application Data

(60) Provisional application No. 60/221,604, filed on Jul. 28, 2000.

(51) Int. Cl.$^7$ ................................................ F21V 9/02
(52) U.S. Cl. .............................. 362/2; 362/20; 362/557; 359/591
(58) Field of Search .......................... 362/1, 2, 20, 228, 362/557, 576; 359/591

(56) References Cited

U.S. PATENT DOCUMENTS

| | | | |
|---|---|---|---|
| 668,404 A | 2/1901 | Hanneborg | ................. 359/597 |
| 4,297,000 A | * 10/1981 | Fries | ........................... 362/557 |
| 4,539,625 A | * 9/1985 | Bornstein et al. | ........... 362/576 |
| 5,371,660 A | * 12/1994 | Levens | ........................ 362/576 |
| 6,014,489 A | 1/2000 | Johanson | ..................... 385/133 |
| 6,024,475 A | * 2/2000 | Kufrovich et al. | .......... 362/576 |

* cited by examiner

Primary Examiner—Stephen F. Husar
(74) Attorney, Agent, or Firm—Galgano & Burke, LLP

(57) ABSTRACT

Hybrid lighting systems use light distributor tubes to distribute artificial light and natural sunlight through the same distributor tubes. Devices for gathering uncollimated light from conventional sources (such as electrically energized arcs or filaments housed in evacuated or gas filled glass envelopes) and directing the light into the ends of tubes designed to distribute such light. Devices for gathering and concentrating inherently collimated sunlight to be fed into the same light distributing tubes used by the artificial light. One preferred embodiment comprises a light gathering and concentrating system in the form of a pair of opposed parabolic reflectors, one which is preferably large, e.g. having a diameter of five feet, and the other much smaller, e.g. the size of the much smaller distribution tubes. This light gathering system is connected to the light distribution tubes through a pair 90° elbows which are rotatable in the X and Y axis in order to track the location of the sun in the sky. The two parabolic reflectors are positioned to share a common focal point so that the larger reflector will direct the sunlight through the focal point of the smaller reflector, which will, reflect the light as concentrated, collimated light. A central aperture in the larger reflector passes the concentrated beam on its way to the distribution tubes.

26 Claims, 28 Drawing Sheets

FIG. 15
FIG. 14
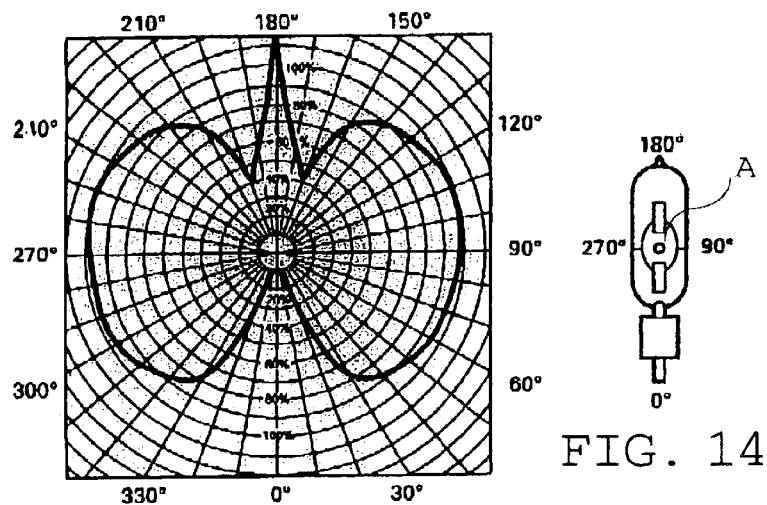
FIG. 16
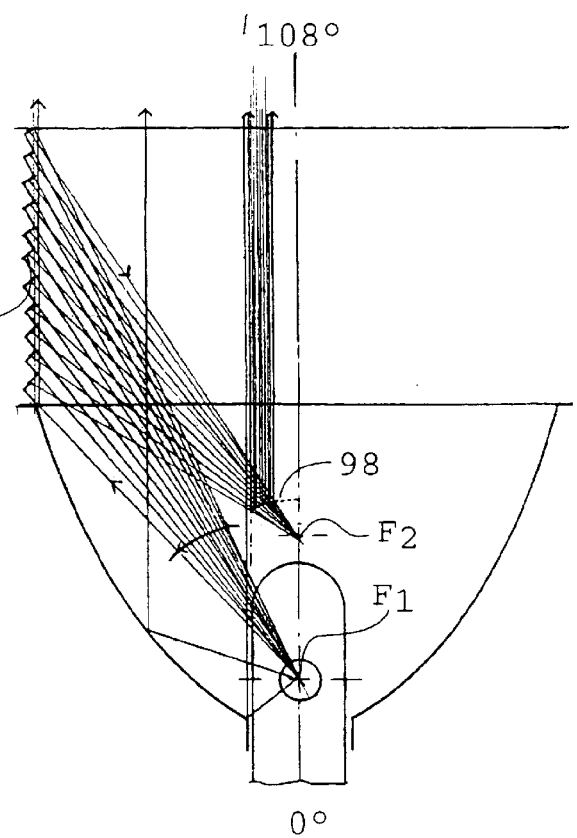

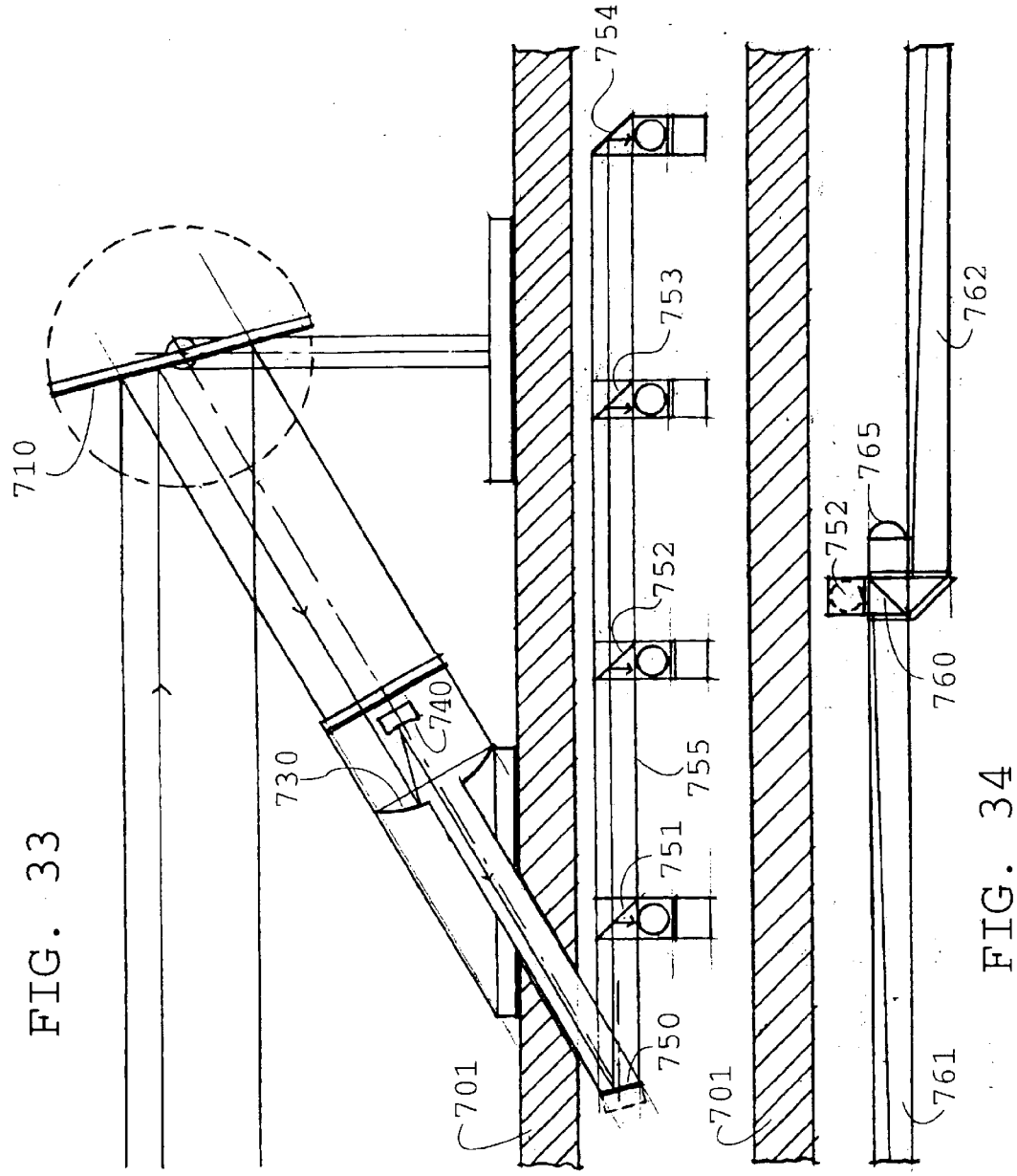

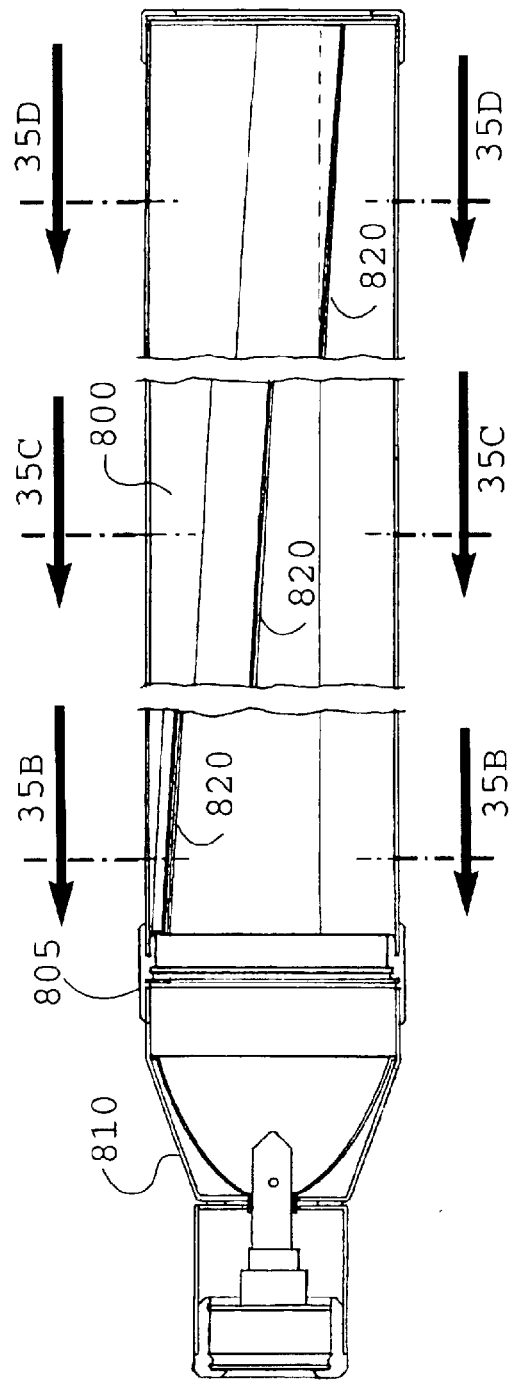
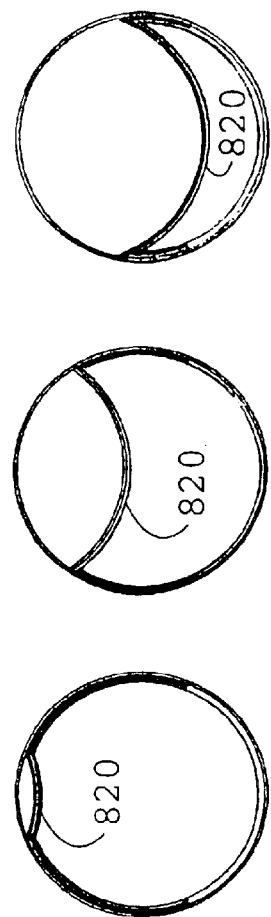
FIG. 35A FIG. 35B FIG. 35C FIG. 35D

LIGHT TUBE SYSTEM FOR DISTRIBUTING SUNLIGHT OR ARTIFICIAL LIGHT SINGLY OR IN COMBINATION

RELATED APPLICATION DATA

This application claims the benefits of U.S. Provisional Patent Application No. 60/221,604 filed on Jul. 28, 2000.

BACKGROUND OF THE INVENTION

Fossil fuel is a finite resource, the burning of which has incipient environmental consequences. An increase in the use of alternative energy sources is desirable, as is better efficiency in the use of all energy. Photovoltaic generation of electricity is a broad, high tech energy source but still has limitations with respect to scale and storage.

Solar interior illumination is a relatively low tech alternative source, and offers huge saving in terms of fossil fuel. Except for window panes and sky lights, however, interior solar lighting has been clumsy, costly and difficult because both the intensity and the angles of sunlight vary so widely with time of day, with the seasons, and with the weather. Meanwhile, lighting systems which use a lot of electricity while the sun shines are almost universal.

One improvement in the use and distribution of light has come with the inventions disclosed in U.S. Pat. No. 6,014, 489 owned by the Ply-Light Corporation of Saint Paul Minn. and sold under the trademark Ply-Light. The tubes receive substantially collimated light and distribute it efficiently over large areas in the form of diffused i.e. uncollimated, light. The Ply-Light® tubes distribute artificial light which starts life inherently uncollimated. Since these tubes work best if their inputs are in the form of substantially collimated light, one aspect of the present invention addresses the technology for converting uncollimated artificial light sources to substantially collimated light for more efficient use in the new tubes.

The technology for making artificial light is improving with new, powerful, energy-efficient light sources such as metal halide-based electric lamps as well as small glass envelopes filled with gaseous sulphur compounds that virtually burst into luminescence in the presence of a microwave electromagnetic field. The basic appeal is savings in fuel required to make the electricity to power the new lights. Since the new light sources are centralized and can use light-distributing tubes, they can also eliminate some labor-intensive and costly procedures such as installing many discrete, heat-generating electric light fixtures, to say nothing of the life time chore of changing many dead bulbs and fluorescent tubes, often in inaccessible places, and disposing of them safely.

So single lighting systems which can efficiently distribute either solar light when the sun shines or controllable artificial light through the same tubes when sufficient sunlight is not available, will have appeal to the environmentalist and economist alike. The various aspects of the present invention are directed to this new technology. The new high-intensity light sources, however, crave better and more efficient means of distribution.

SUMMARY OF THE INVENTION

Various embodiment of the present invention provide devices for gathering uncollimated light from conventional sources (such as electrically energized arcs or filaments housed in evacuated or gas filled glass envelopes) and directing the light in the form of a beam of substantially collimated light into the ends of tubes designed to distribute such light, such as those disclosed in U.S. Pat. No. 6,014, 489.

Aspects of the present invention also provide devices for gathering and concentrating inherently collimated sunlight to be fed into the same light distributing tubes used by the artificial light. One preferred embodiment of the present invention comprises a light gathering and concentrating system in the form of a pair of opposed parabolic reflectors, one which is preferably large, e.g. having a diameter of five feet, and the other much smaller, e.g. the size of the much smaller distribution tubes. This light gathering system is connected to the light distribution tubes through a pair 90° elbows which are rotatable in the X and Y axis in order to track the location of the sun in the sky. The two parabolic reflectors are positioned to share a common focal point so that the larger reflector will direct the sunlight through the focal point of the smaller reflector, which will, by optical definition, reflect the light as concentrated, collimated light. A central aperture in the larger reflector passes the concentrated beam on its way to the distribution tubes.

The collimation can be accomplished, for example, by precision, parabolic reflectors, with or without attachments or by directing the internally reflected light from an elliptical reflector into the back end of a parabolic reflector, with the light source positioned at the first focal point within the elliptical reflector and the parabolic reflector located with its own focal point in precise coincidence with the second focal point of the elliptical reflector. The collimated light output is then directed to the distributing tubes, changing direction where required, using reflectors, e.g., planar reflectors.

Another preferred embodiment described in further detail below comprises two sets of larger-smaller parabolic reflectors arranged to minimize the losses inherently caused by the position of the smaller parabolic reflector in the path of the sun striking the larger parabolic reflector.

This unique use of dual light sources with a single distribution system is made possible by a light blending device which preferably comprises two oppositely directed, planar, partially reflecting surfaces both of which pass light bi-directionally through both surfaces at the same time. The two types of light, in this case sunlight and artificial light, are arranged into two substantially collimated light beams which intersect within a certain range of angles. The light blending device is placed at the intersection of the two beams at an angle which is precisely half of the angle of intersection of the beams. According to one preferred embodiment, two output light beams are produced, fulfilling the equation ½ (S+A) where S is the beam of sunlight and A the beam of artificial light. The outputs can also be all sunlight, all artificial light or any combination of the two. The outputs are conducted into light distributing tubes designed to use substantially collimated light. In a system based on solar light supplemented or supplanted by artificial light, the intensity of the artificial light is controlled as a function of the intensity of the light in the area being illuminated. The intensity of the artificial light is automatically adjusted up or down as required to maintain uniform lighting. Passing clouds in the daytime, will result in a small increase in the artificial light level while the darkness of night can result in a shift to artificial light.

According to another aspect of the present invention, one or more of the several reflectors in the system can be made to separate the visible spectrum of the light from the invisible (including infra red). The visible light can be directed into the light distribution system while the invisible light can be filtered to eliminate it. The visible light will be "cool", significantly lowering the demand for air conditioning. Another advantage of the present systems is that they allow the artificial light sources to be centralized where their excess heat can be vented to the outdoors in warm weather and into the building in cold weather.

Preferred embodiments of the present invention comprise light sensors which can monitor and adjust the amount of artificial light added to the system necessitated by fluctuations in available sunlight.

Other aspects of the present invention comprise improved sunlight collimators and concentrators, improved reflectors for both natural and artificial light, and improved connectors for connecting artificial light with distributor tubes.

These and other advantages of the various embodiments of the present invention are described in greater detail below.

BRIEF DESCRIPTION OF THE DRAWINGS

FIG. 14 illustrates one source of artificial light useful with the present invention.

FIG. 15 is a graphic display of the intensity of light distributed from the artificial light source shown in FIG. 31.

FIGS. 16 and 17 illustrate a device designed to maximize the amount of useful collimated light obtained form the artificial light source shown in FIG. 31.

FIGS. 33 and 34 illustrate an other embodiment of the present invention.

FIGS. 35A–D illustrates a preferred light distributor tube useful with the present invention.

DETAILED DESCRIPTION

Figure 1:
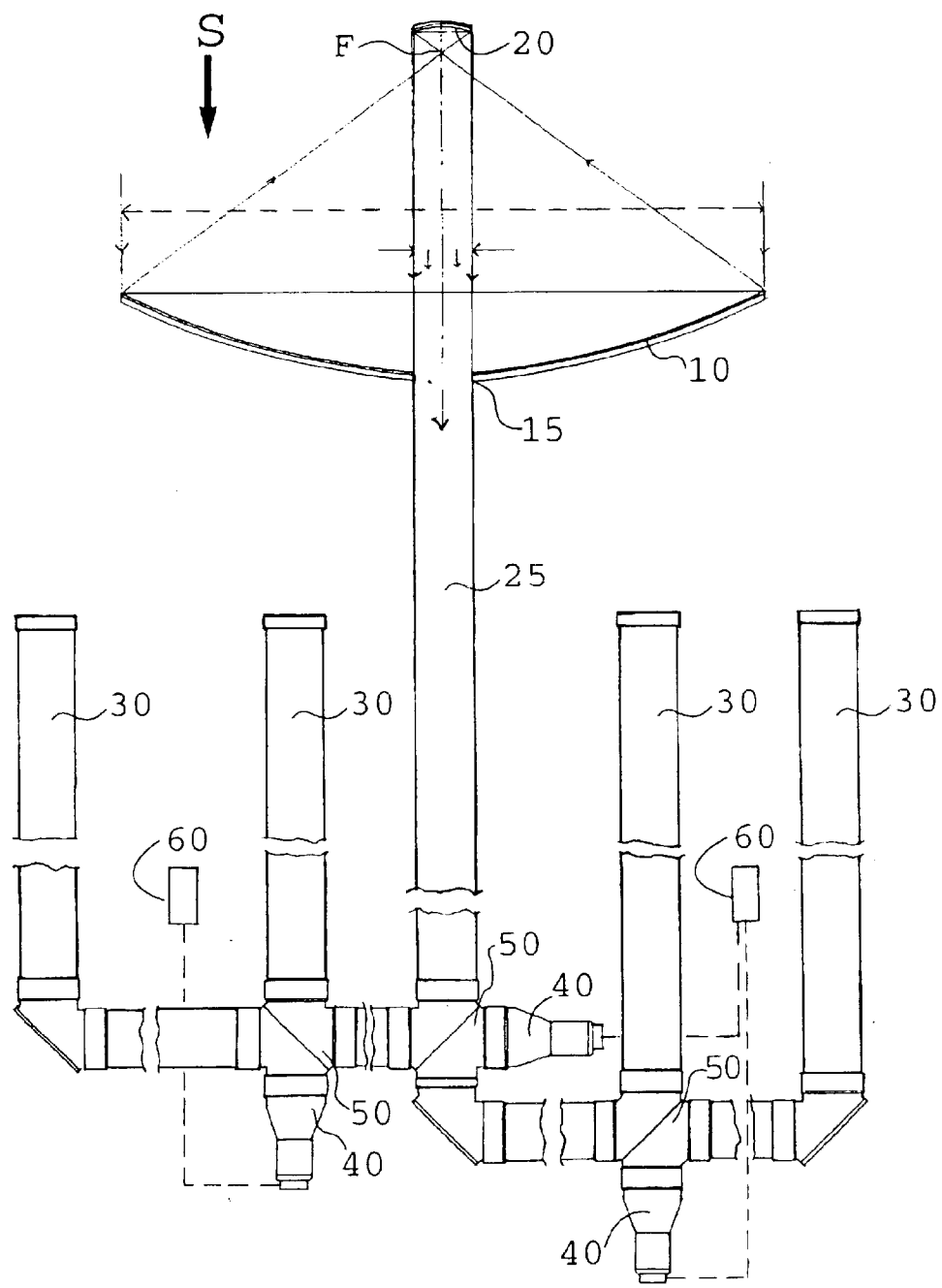
FIG. 1 is a schematic view of one embodiment of the present invention.
Figure 2:
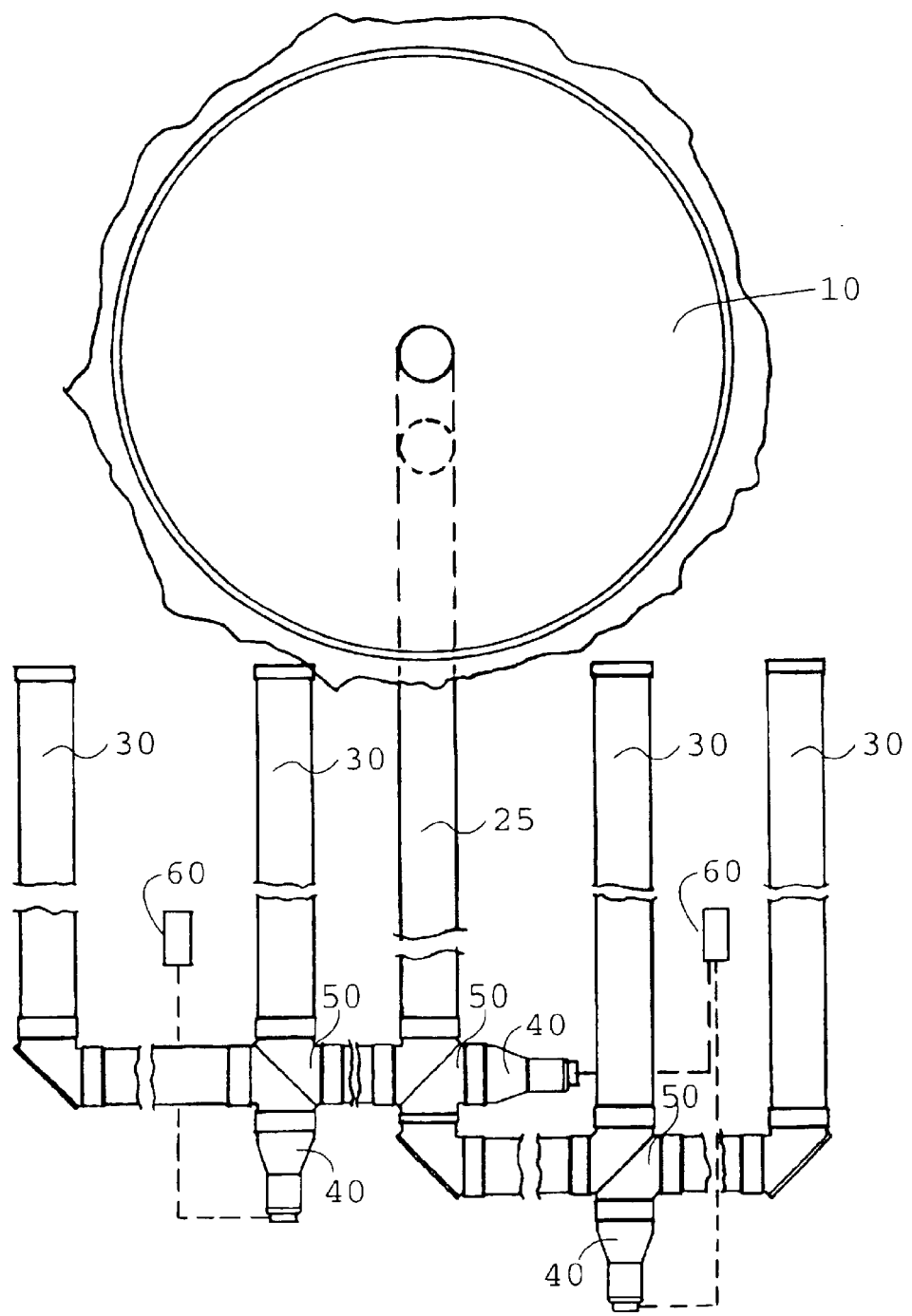
FIG. 2 is a schematic view of an embodiment of the present invention from above.
Figure 3:
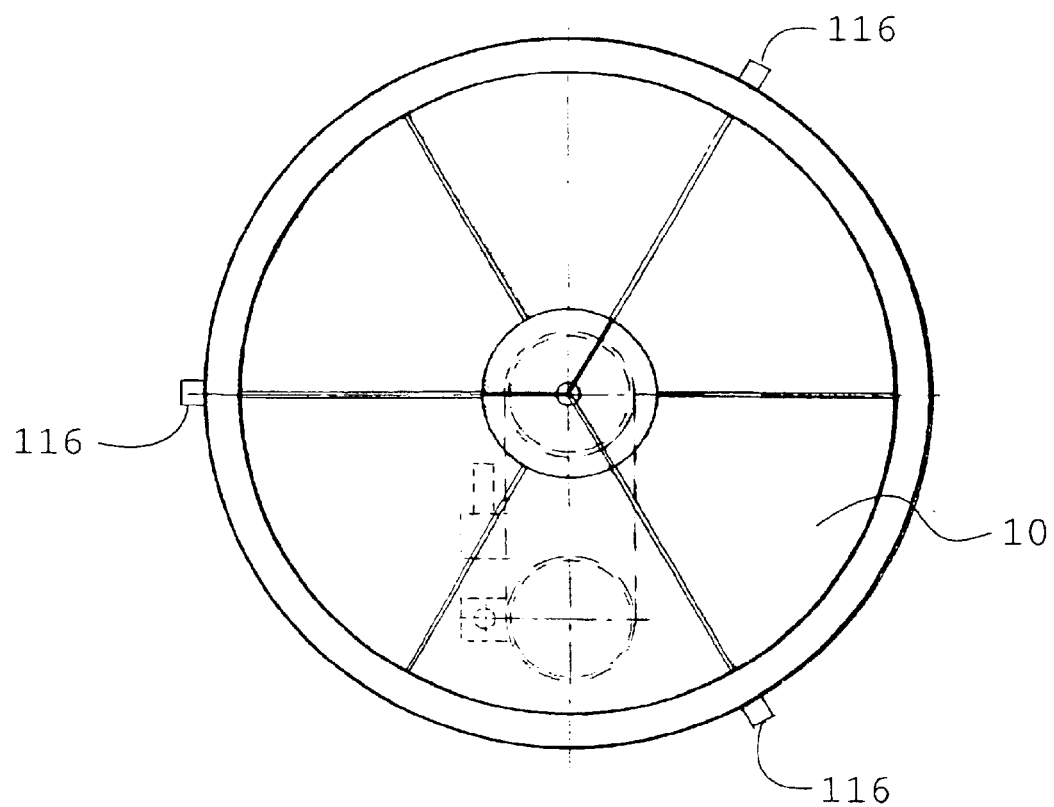
FIG. 3 is a top view of a parabolic reflector of an embodiment of the present invention.

Various embodiments of the present invention relate to systems for collecting and concentrating sunlight and directing concentrated sunlight and/or collimated artificial light into at least one light distributor tube. FIG. 1 is a schematic of one embodiment of the present invention comprising a parabolic reflector 10 having a central through hole 15 which allows for the passage for concentrated sunlight reflected off parabolic reflector 20. Parabolic reflector 10 and concave parabolic reflector 20 are positioned to share a common focal point F such that sunlight entering in the direction of arrow S will strike parabolic reflector 10 and be reflected to concave parabolic reflector 20 which will then reflect the light through the central hole 15 in parabolic reflector 10. The combination of the parabolic reflector 10 and concave parabolic reflector 20 concentrate and recollimate the sunlight for introduction into a single distributor system. This illustrated system also comprises four light tubes 30, three artificial light sources 40, light blender devices 50 and light sensors 60. The sunlight passing down through entrance tube 25 is reflected into distributor tubes 30 and, where desired, supplemented or supplanted by the artificial light from artificial light sources 40. FIG. 2 is a plan view of a similar embodiment as viewed from above when the parabolic reflector is facing upwardly. In order to facilitate installation a large parabolic reflector can be formed in segments as shown in FIG. 3.

Figure 4:
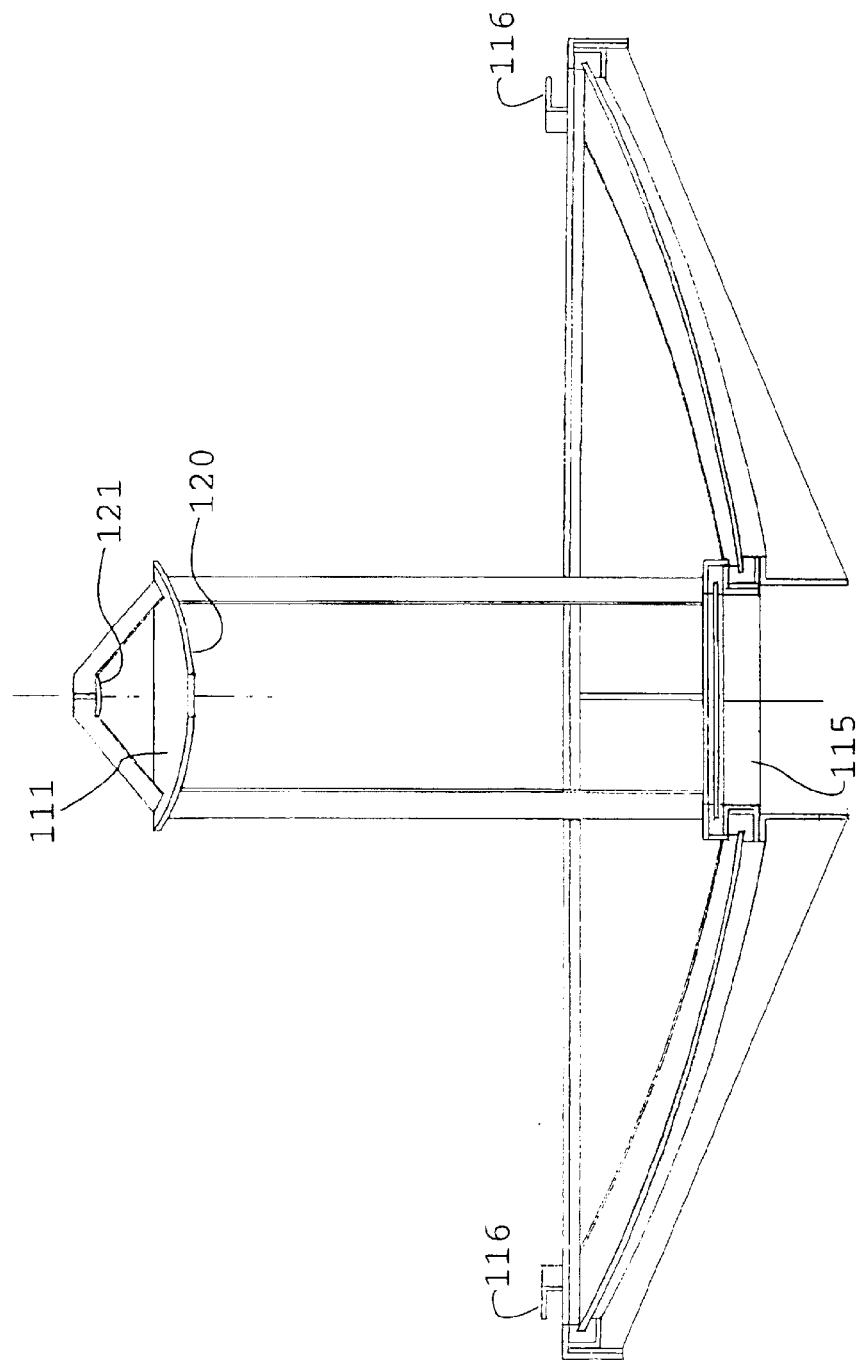
FIG. 4 is another sunlight collector and concentrator of the present invention.

FIG. 4 illustrates a preferred arrangement for collecting, concentrating and recollimating sunlight comprising in large concave parabolic reflector 110, a large convex parabolic reflector 120, the back end of which forms a small parabolic reflector 111 and a smaller convex reflector 121. The large concave parabolic reflector 110 and large convex parabolic reflector 120 are positioned to share a common focal point. Similarly, smaller concave parabolic reflective surface 111 and small convex parabolic reflector 121 also share a common focal point. This preferred sunlight concentrator advantageously minimizes the amount of lost sunlight which is blocked by the non-reflective side of reflector 20 shown in FIG. 1. In the embodiment shown in FIG. 4, the sunlight striking parabolic reflector 110 is directed to concave reflector 120 and then reflected as a concentrated, collimated beam of sunlight through center hole 115 in parabolic reflector 110 and to the distributor system. Similarly, sunlight striking parabolic reflective surface 111 on the back of reflector 120 is directed to reflector 121 which then directs that sunlight as a collimated concentrated beam through the center hole of parabolic reflector 120 and to the light distributing system. This preferred light concentrator also comprises sunlight detectors 116 which are used to maintain the proper orientation of the sunlight concentrator in order to maximize the amount of sunlight striking the parabolic reflectors 110 and 111. It is preferable to have at least three and possibly more sunlight detectors 116 at spaced positions around the periphery of the support for parabolic reflector 110. Sunlight detectors 116 are preferably linked to suitable controls for affecting the movement of the entire sunlight concentrator, i.e., the precise controls, linkages, computer hardware software.

Figure 5:
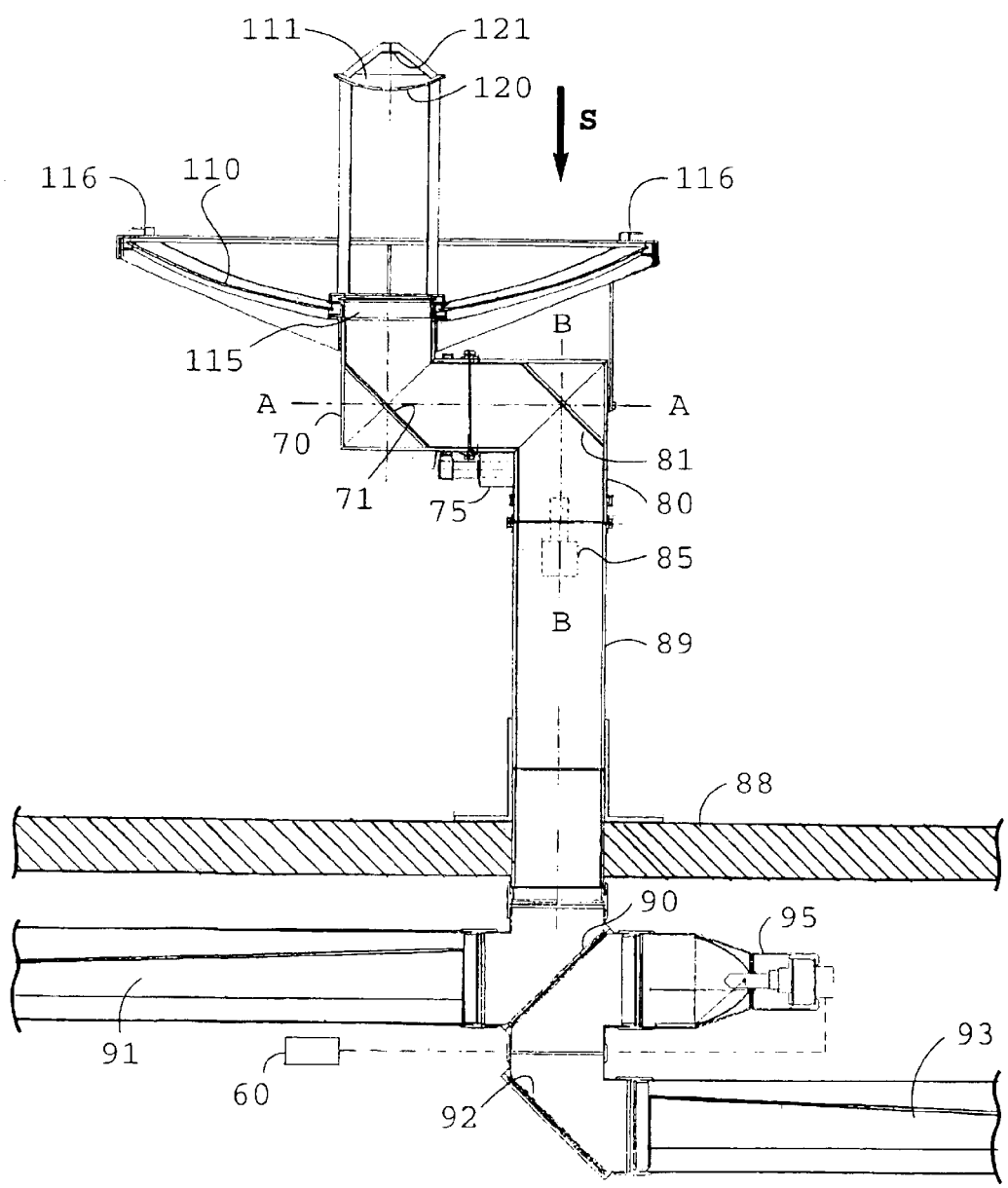
FIGS. 5–9 illustrate the attachment of the sunlight concentrator of FIG. 4 with light distributor to according to one preferred embodiment of the present invention.

FIG. 5 illustrates one preferred embodiment of the present invention in the form of a hybrid lighting system which utilizes natural sunlight and/or artificial light at any given time. This illustrated embodiment includes the sunlight concentrator of the type shown in FIG. 4. The sunlight concentrator is connected to two elbows each comprising a reflector. Upper elbow 70 receives light directly from the sunlight concentrator and comprises a planar reflector, e.g. a mirror 71 which reflects incoming sunlight at an angle of 90 degrees. Reflector 71 can be rectangular or oval, or any other desired shape which adequately reflects sunlight received from the sunlight concentrator. Upper elbow 70 is advantageously rotatable about axis A—A and is controlled by motor 75 and suitable linkages. The linkages can be belts, gears or other linkages as desired. Light exiting upper elbow 70 enters lower elbow 80 which is rotatable about axis B—B. Lower elbow 80 comprises a reflective surface such as a mirror which redirects the incoming sunlight downwardly through tube section 89 and through the roof. While the illustrated embodiments show natural sunlight being directed through a roof, this is solely for purposes of illustration. The advantages of the present invention can be enjoyed with systems that direct sunlight outside of a building or into other areas where illumination is desired. Lower elbow 80 is also advantageously rotatable around axis B—B and is controlled by motor 85 which is linked to lower elbow 80 by suitable linkage. The combined effect of the rotation of upper elbow 70 and lower elbow 80 permits the sunlight concentrator to track the sun through any position in the sky while always directing the sunlight down tube 89. In this illustrated embodiment tube 89 directs the concentrated sunlight through roof 88 into a light blender. Tube 98 can, for example, be formed of a structural material such as aluminum and preferably has an internal surface which is highly reflective.

In the embodiment illustrated in FIG. 5, sunlight exiting tube 89 strikes a beam splitter 90 which reflects a first portion of the sunlight into light distributor tube 91 while allowing another portion of the sunlight to pass through beam splitter 90 to reflector 92 which reflects the sunlight into light distributor tube 93. While the preferred light distributor tubes are of the type disclosed in U.S. Pat. No. 6,014,849, other forms of distributor tubes can be utilized without departing from the scope of the present invention. Those skilled in the art will appreciate that if other types of distributor tubes are utilized, then it may be necessary to take steps to uncollimate the light in order to provide for proper light distribution out of such other light distributor tubes.

In one embodiment, the first side of beam splitter 90 reflects substantially half of the incoming sunlight to light tube 91 while allowing the other half to proceed to reflector 92 and into light tube 93. Artificial light source 95 is used to supplement and/or supplant the incoming sunlight. Substantially collimated artificial light from artificial light source 95 strikes the second side of beam splitter 90 opposite the side first encountered by incoming sunlight. Beam splitter 90, according to this illustrated embodiment, allows half of the collimated artificial light to proceed relatively unimpeded to light distributor tube 91 while reflecting the other half to reflector 92 and ultimately to light distributor tube 93.

Figure 6:
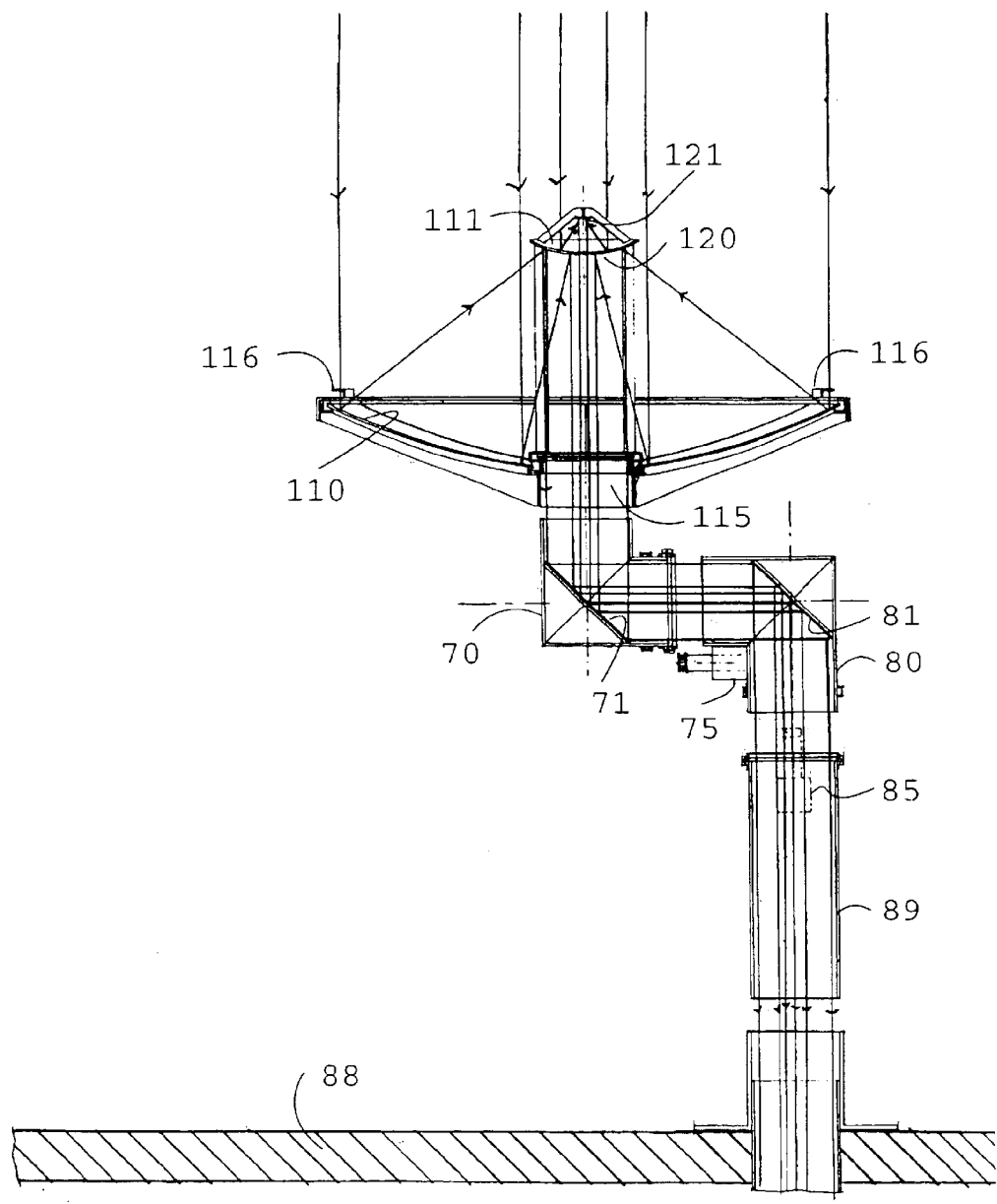

FIG. 6 provides an illustration of how incoming rays of sunlight are concentrated and transmitted through a sunlight concentrator, upper and lower elbows and into a building.

Figure 7:
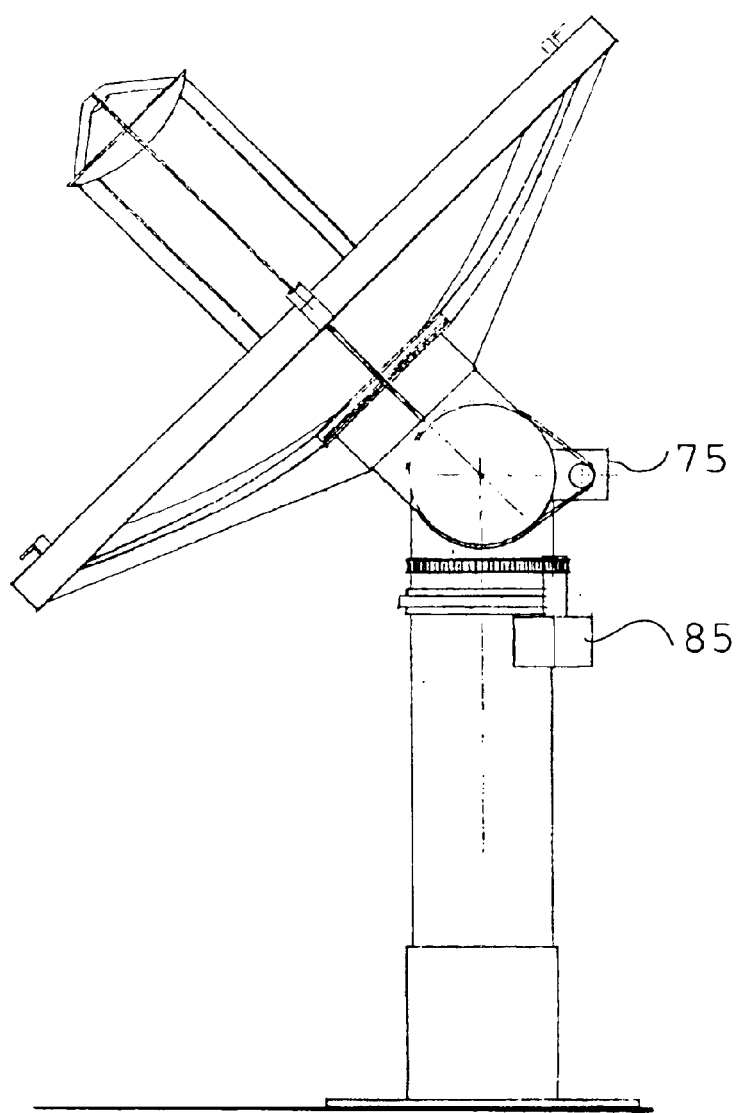

FIG. 7 is a side view of the portion of the embodiment shown in FIG. 6 above the roof line with the sunlight concentrator shown in a tilted position.

Figure 8:
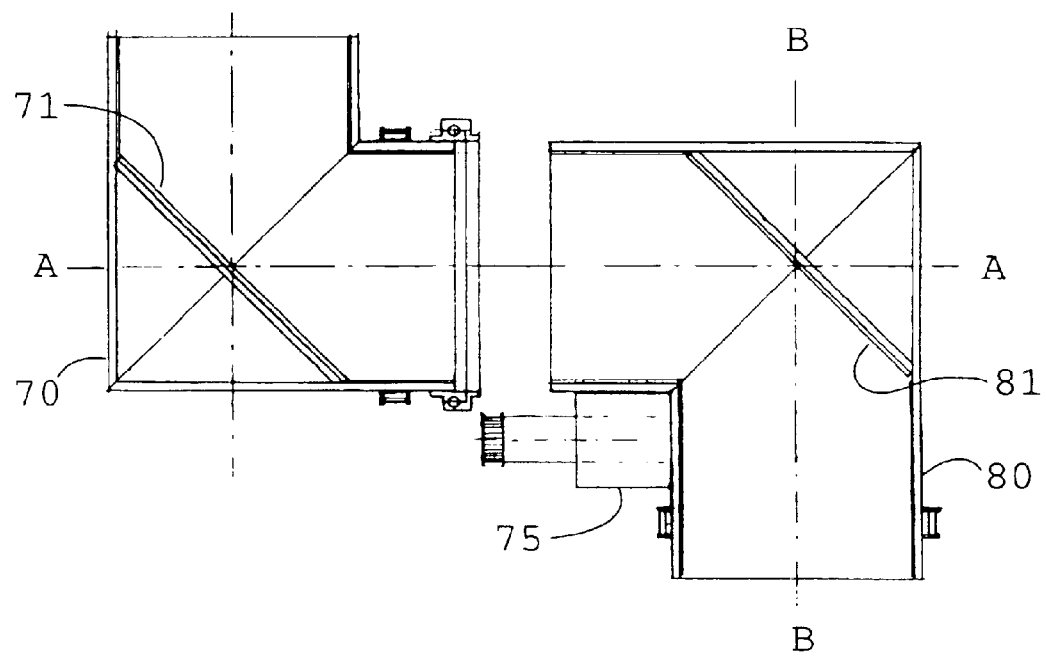

FIG. 8 is a segmented view of the upper and lower elbows.

Figure 9:
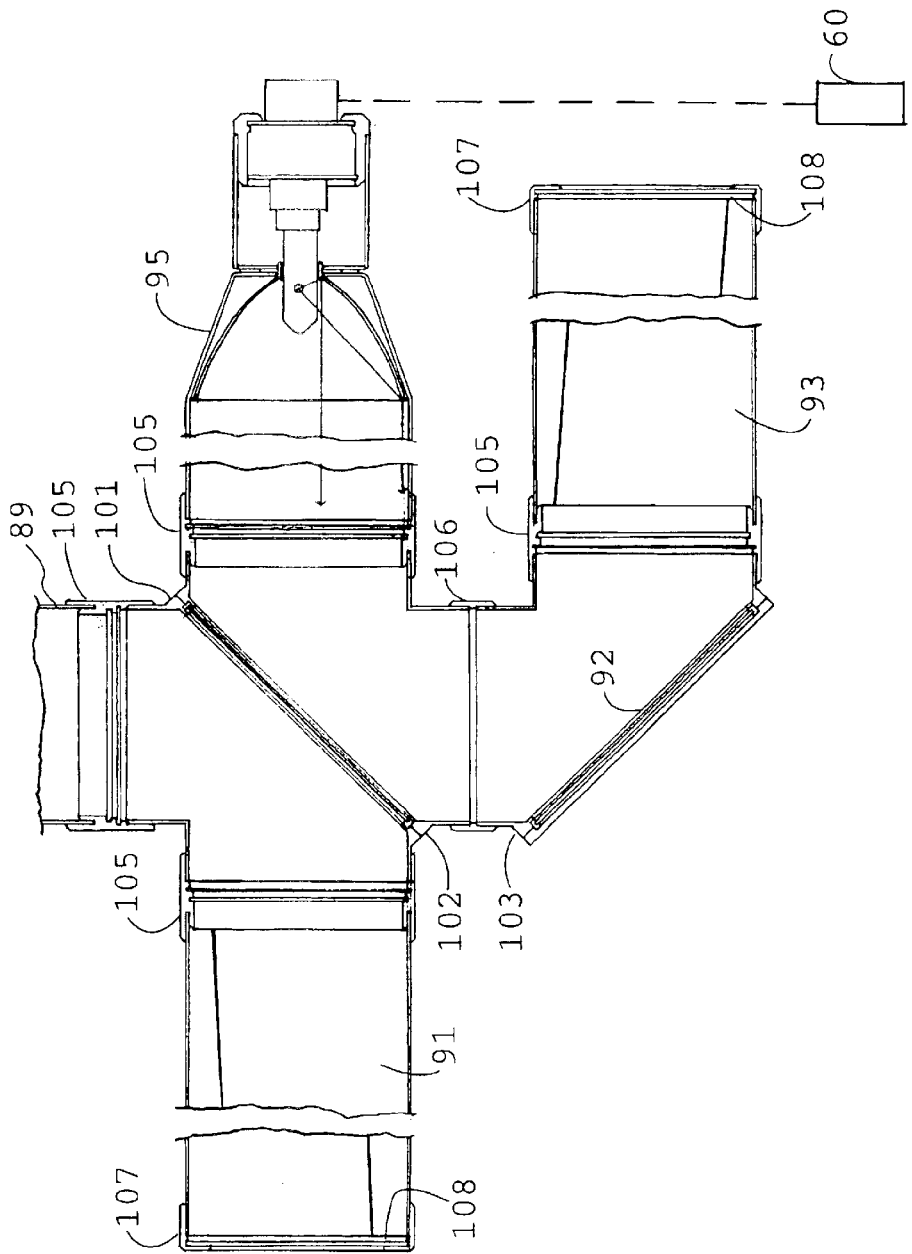

FIG. 9 is an enlarged view of the light blender section and distributor tubes shown in FIG. 6. In this embodiment, tube 89 is connected to a three-piece blender box formed by upper segment 101, middle segment 102 and lower segment 103. Light distributor tube 89 is connected to upper segment 101 with a silicone ring 105 artificial light source 95 is connected to middle segment 102 of the blender box by a silicone ring 105 and both light tubes 91 and 93 are connected to their respective blender box segments by silicone rings 105. Middle segment 102 of the blender box is connected to the lower segment 103 by a silicone ring 106. Each of the light distributor tubes is provided with an end cap 107 which secures a reflector 108 on the end of the distributor tube. Reflectors 108 direct any light which has not already been directed out of the distributor tubes back into the distributor tubes.

Figure 10:
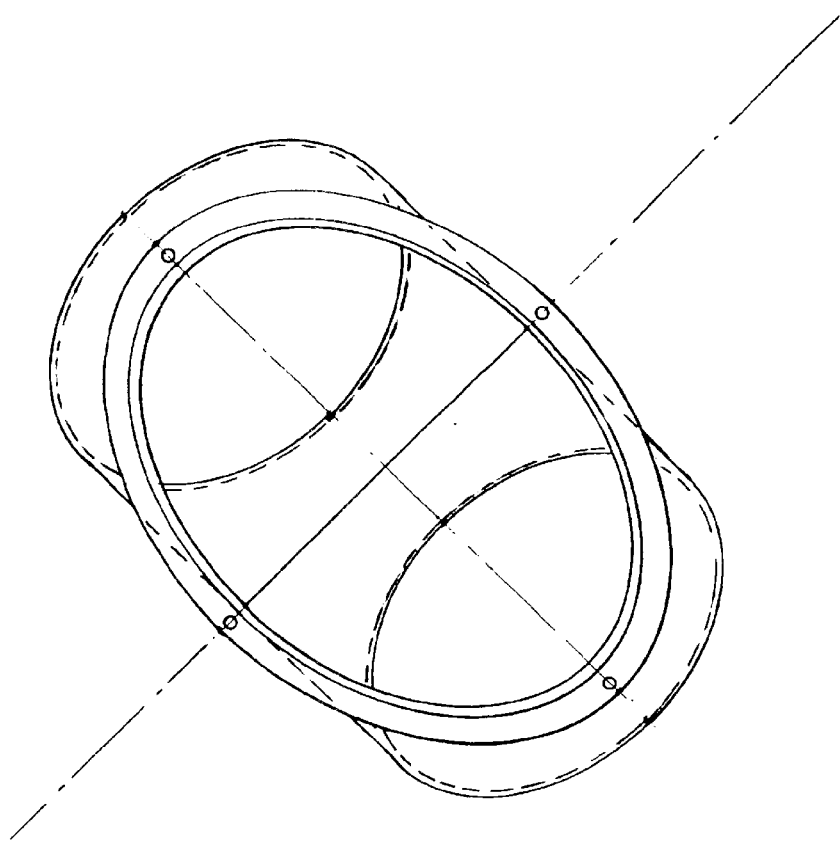
FIGS. 10–13 illustrate components of one preferred device for blending artificial and natural light of the present invention.
Figure 12:
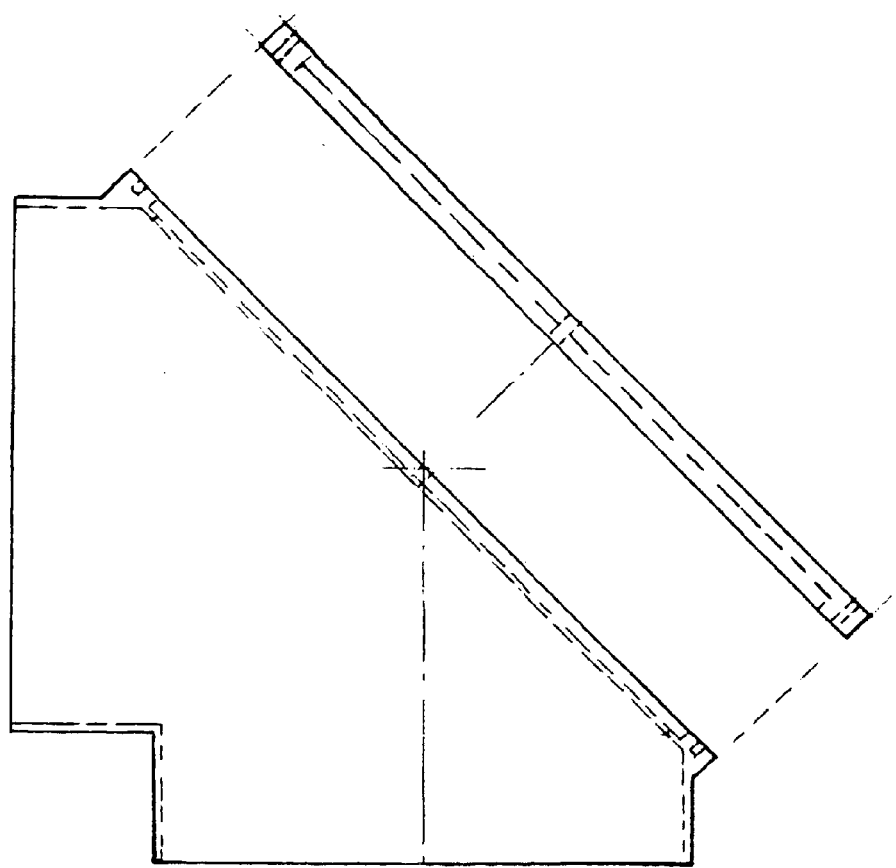
Figure 11:
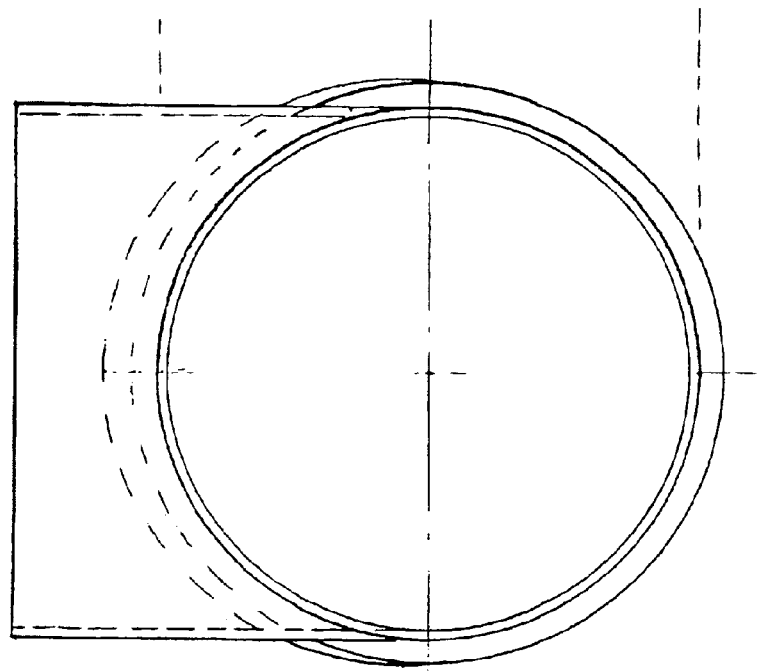

FIGS. 10, 11, and 12 are elevation views, top views and side views, respectively, of upper segment 101 of the blender box shown in FIG. 10.

Figure 13:
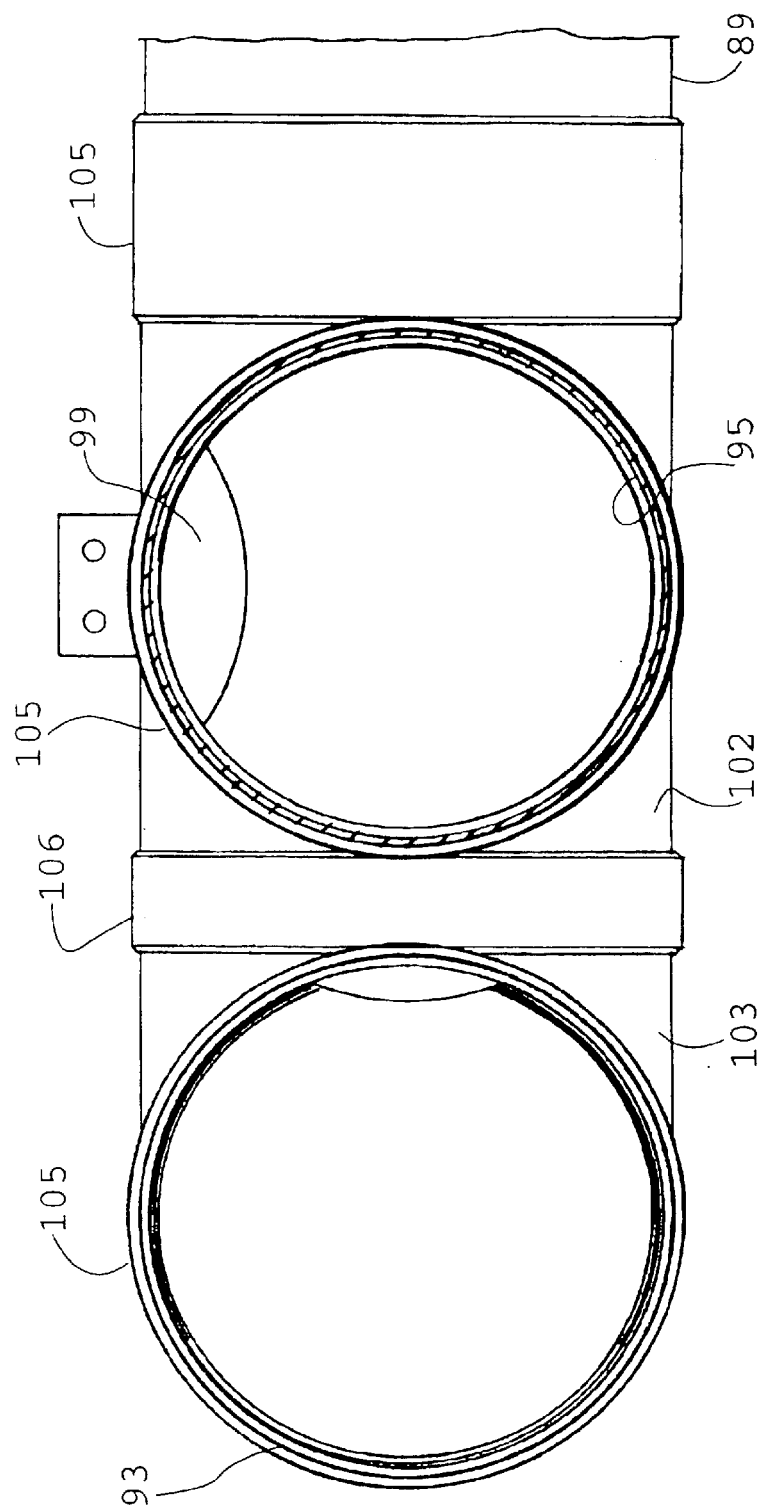

FIG. 13 is a portion of a blender box. The circle on the right is the connector 105 to an artificial light source 95. This connector 105 holds a light baffle 99 which reflects light back into the bulb in order to prevent the element in the light distributor tube. This light baffle 99 is particularly useful when using distributor tubes of the type shown in U.S. Pat. No. 6,014,489 which comprise a gradually tapering light distributor for reflecting light out of the distributor tube. FIGS. 35A through 35D provide a representation of a light distributor tube 80 connected to an artificial light source 810 by a silicone ring. FIGS. 35B, 35C and 35D are cross-sectional views taken along lines BB, CC, DD, respectively. These cross-sectional views show the relatively increasing cross-section of light distributor 820 of this illustrated embodiment as the light distributor gradually intersects more of the light beam along the length of the distributor tube 800 as the light beam travels away from the artificial light source 810. The baffle 99 is designed to prevent the heat from the artificial light source from overheating or burning the distributor 820 if this type of light distributor tube is utilized. Other shapes and sizes of baffles can be utilized without departing from the scope of the present invention in order to accommodate different sizes and shapes of light distributors and for tight distributor tubes.

FIG. 14 is a schematic representation of an artificial light source, e.g. a Philips CDM-SA/T 150-watt metal halide bulb which may be utilized with the present invention. This type of artificial light source is particularly suitable since it has a relatively short arc which is readily positionable at the focal point.

FIG. 15 is a schematic representation of the intensity of artificial light emanating from the artificial light source shown in FIG. 14. The dark lines on the draft indicate the intensity of the beam at various angles relative to the orientation of the light source. The angles on the graph in FIG. 15 correspond to the indications of 0°, 90°, 180° and 270° shown on FIG. 14. As indicated on the graph in FIG. 15, most of the artificial light leaving this artificial light source is directed between 25° and 155°, and between 205° and 335°. If the arc of the light source, which is represented by the small circle A in the center of the bulb is placed at the focal point of a parabolic reflector having a focal length of 0.5 inches and the parabola is designed to be connected with a tube having a diameter of 5½ inches, then the portion of the light between 135° and 155° and between 205° and 225° would not hit the reflective surface of the parabolic reflector and therefore would not be collimated prior to entry into the light distributor tube. Since some distributor tubes, particularly the distributor tubes discussed in the above-referenced patent, operate most efficiently when receiving collimated light, it is desirable to collimate the maximum amount of light possible.

FIG. 16 illustrates a modified parabolic reflector designed for an artificial light source such as that represented in FIG. 15. In this embodiment of the present invention, a serrated extension ring 97 having a highly reflective interior surface is connected to the end of the parabolic reflector and a central reflector 98 is mounted within the center of the parabolic reflector. As generally illustrated in FIG. 16, light exiting the artificial light source between angles 135° and 155° and between 205° and 225° strikes the interior, highly reflective serrated edges of extension ring 97 and are directed toward the centrally located reflector 98 which reflects those light beams as collimated light.

Figure 17:
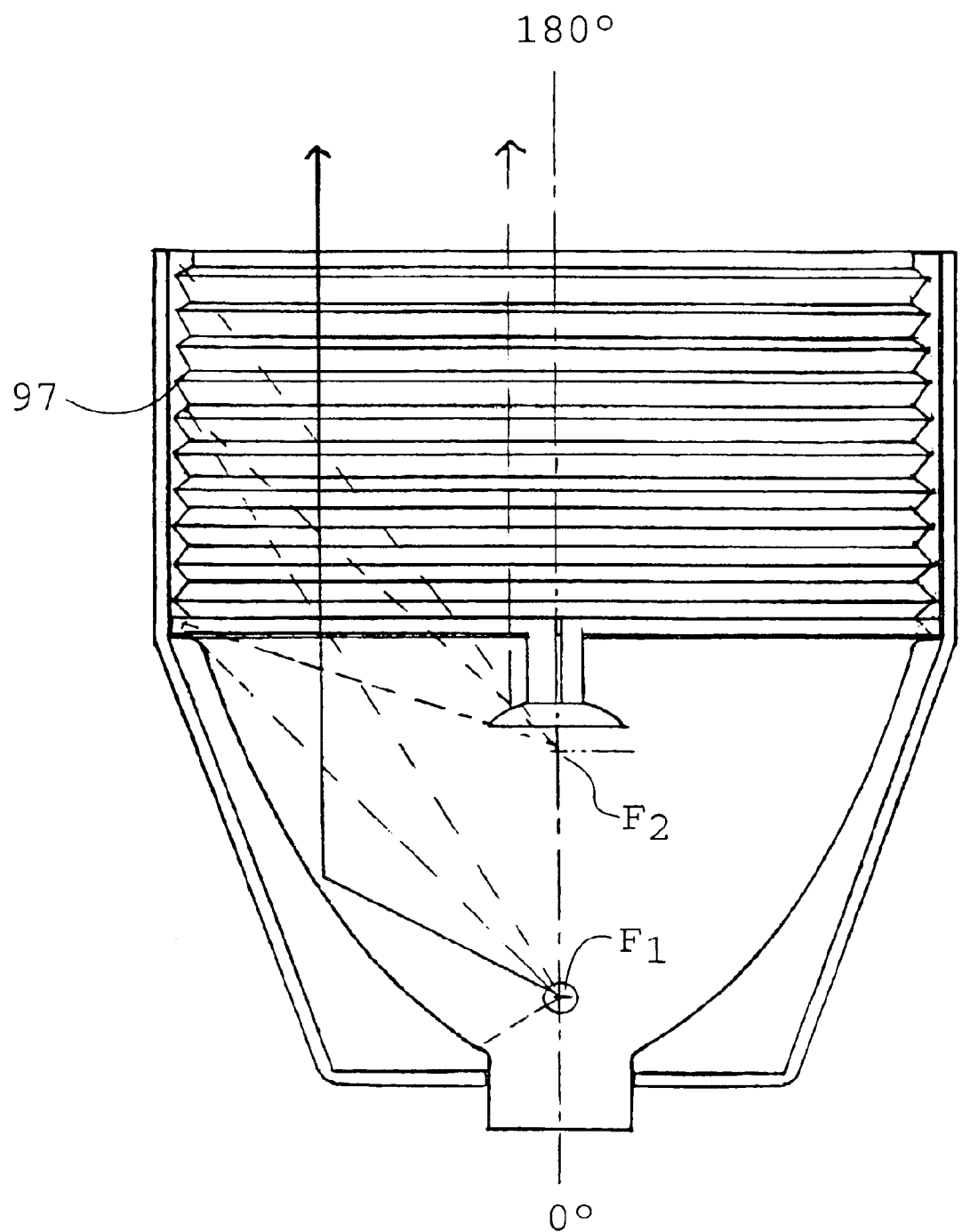

FIG. 17 is another representation of a parabolic reflector comprising a serrated extension ring of the type shown in FIG. 16.

Figure 18:
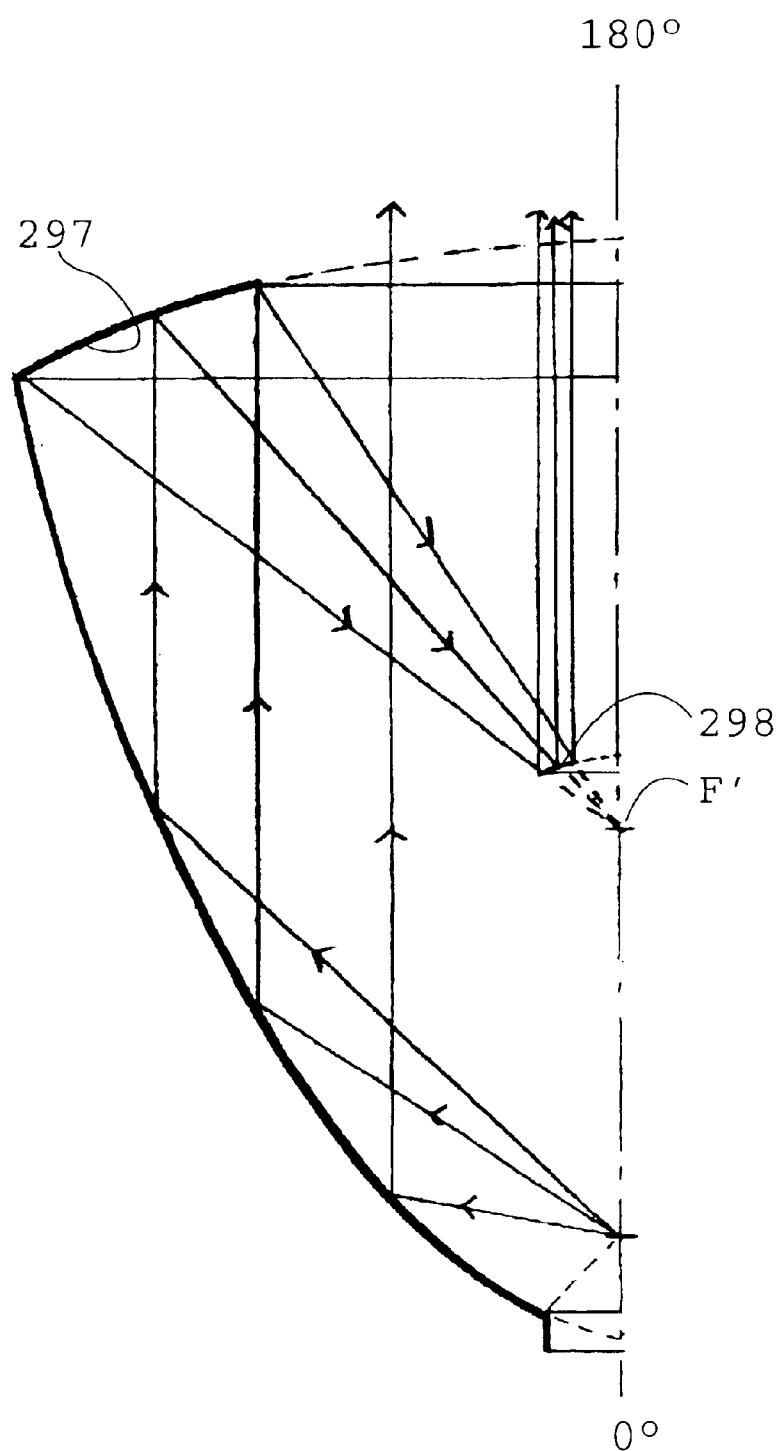
FIG. 18 illustrates an alternative device for collimating light from an artificial light source.

FIG. 18 illustrates another embodiment of a reflector system for an artificial light source designed to capture additional light which would otherwise be lost as explained above. According to the embodiment illustrated in FIG. 18, the end of the parabolic portion of a reflector is provided with a downwardly sloping, inwardly facing parabolic reflective surface 297 which reflects incident light to a centrally located parabolic reflector 298 which then redirects the artificial light beams as a collimated, concentrated light into the distribution system or light blender device, as desired. Parabolic reflective surface 297 and parabolic reflector 298 share a common focal point F' as indicated in FIG. 18.

Figure 19:
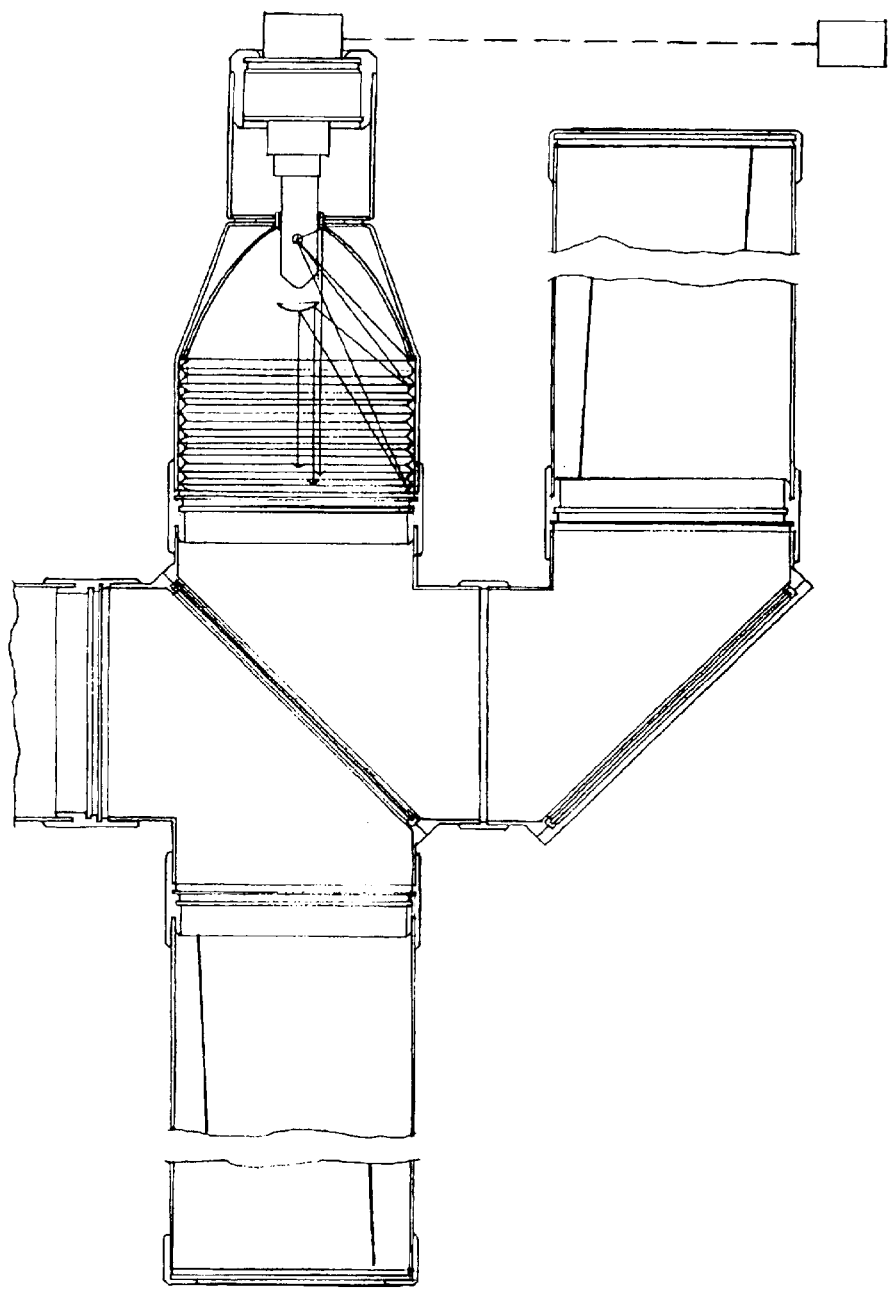
FIG. 19 illustrates the device shown in FIG. 17 attached to a light distributor tube.

FIG. 19 is a view of an alternative embodiment, similar to the embodiment shown in FIG. 10, however, with an improved artificial light reflector having a serrated extension ring.

As noted above, in the illustrated embodiments, the natural sunlight and artificial light are blended using beam splitters arranged at 45° to the incident light. One type of beam splitter useful with the present invention comprises a piece of glass having alternating sections which are uncoated, i.e. clear, and sections which are coated with a reflective material so that at least some incident light is reflected.

Figure 20:
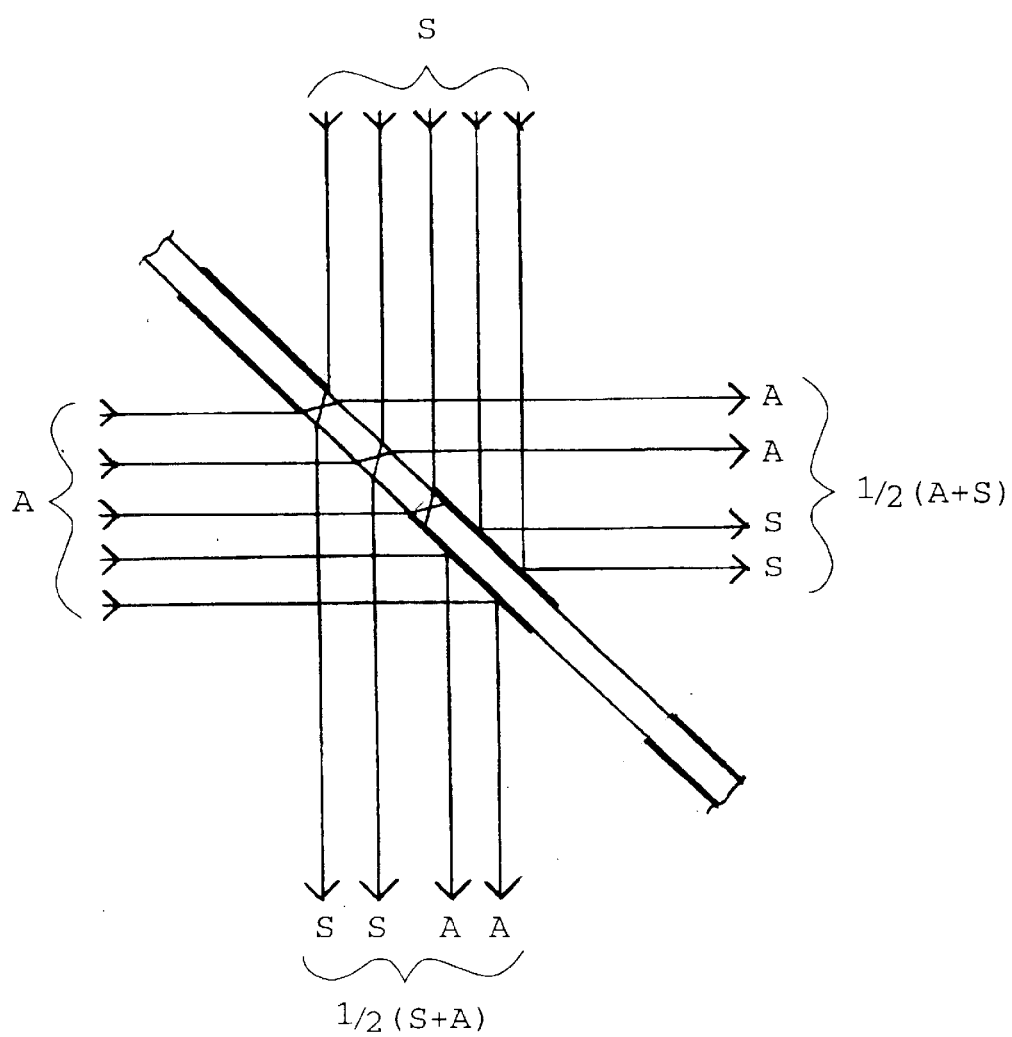
FIGS. 20–23 illustrate various light beam splitters of the present invention.
Figure 21C:
Figure 21B:
Figure 21A:
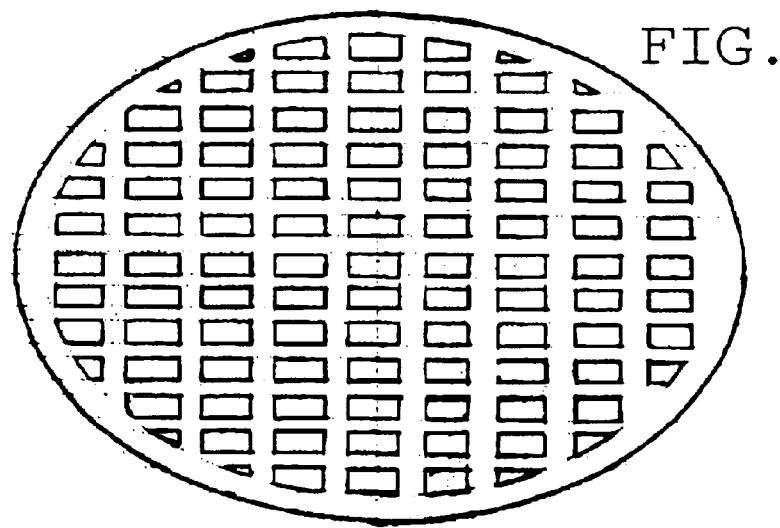

FIG. 20 is a schematic diagram illustrating how a beam splitter of this type operates wherein the arrows designated S represent sunlight and arrows designated A represent artificial light. After encountering the beam splitter, the exiting beams comprise half sunlight and half artificial light. FIGS. 21A, B and C are top, side and cross-sectional views of one arrangement for a beam splitter of this configuration.

Figure 22:
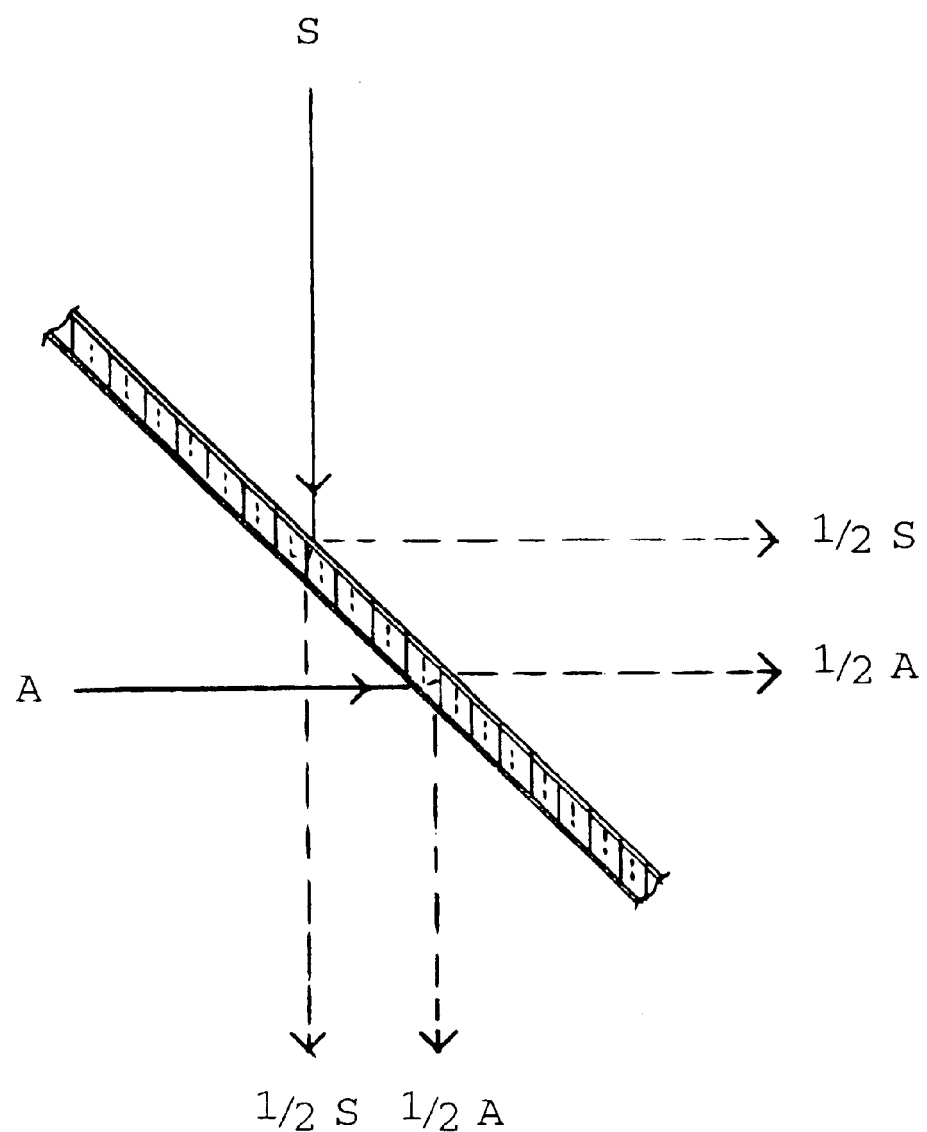

FIGS. 22 and 23 illustrate another form of beam splitter which comprises a dichroic coating designed to allow certain portions of certain types of light to pass through the coating while reflecting the resulting portion of the incident light. Dichroic coatings can also be designed to substantially reflect light of certain wave lengths while allowing light of other wave lengths to pass through the coating. Dichroic beam splitters comprise at least one dichroic coating which reflects a certain portion of either artificial or natural light while allowing the balance of the incident light to pass through.

Figure 23C:
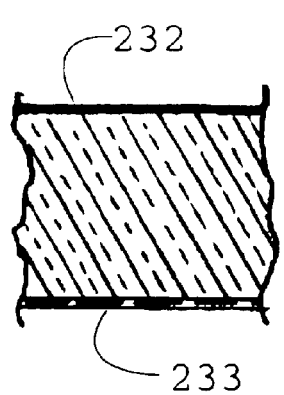
Figure 23B:
Figure 23A:
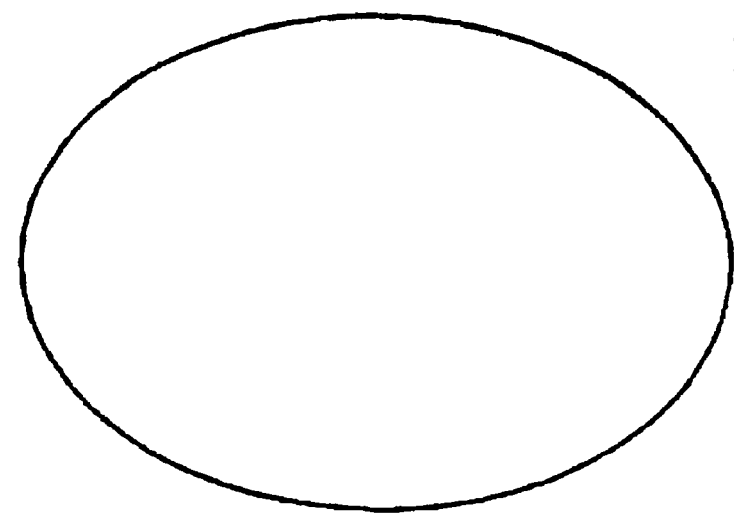

FIG. 22 is a schematic illustration of a dichroic lens wherein the dichroic (beam splitting) coating is balanced so that half of both the incident sunlight and incident artificial light pass through the beam splitter while half of each is reflected. In this illustrated embodiment, the beam splitter is advantageously positioned at an angle of 45° to each of the incident beams of sunlight S and artificial light A. It may be possible to orient a beam splitter at different angles by adjusting the coating and/or the manner in which dichroic coating is applied to the substrate. As indicated in this illustrated embodiment, the result is a substantially equal amount of artificial light and an equal amount of sunlight leaving the dichroic lens. FIGS. 23a, 23b and 23c are the top view, side view and a cross-sectional view of the dichroic lens shown in FIG. 22. With reference to FIG. 23c, surface 232 is anti-reflective while surface 233 is the beam splitting surface. The elliptical shape is design to fit in the opening shown in FIG. 10. As one example of a beam splitter useful with the present invention, a 7.75 inch by 5.5 inch by 3.2 millimeter borofloat substrate, having a clear aperture of 7.1 inches by 5 inches and having a surface quality of 80/50 scratch and dig, was coated on one side with a broad band anti-reflective coating having an average reflectance of less than 1 percent for light having wave length of 425–675 nm at a 45° angle of incidence. The opposite side was coated with a dielectric beam splitter with a transmission equal to 50 percent±10 percent for light having a wave length of 425–675 nm at a 45° angle of incidence.

Figure 24:
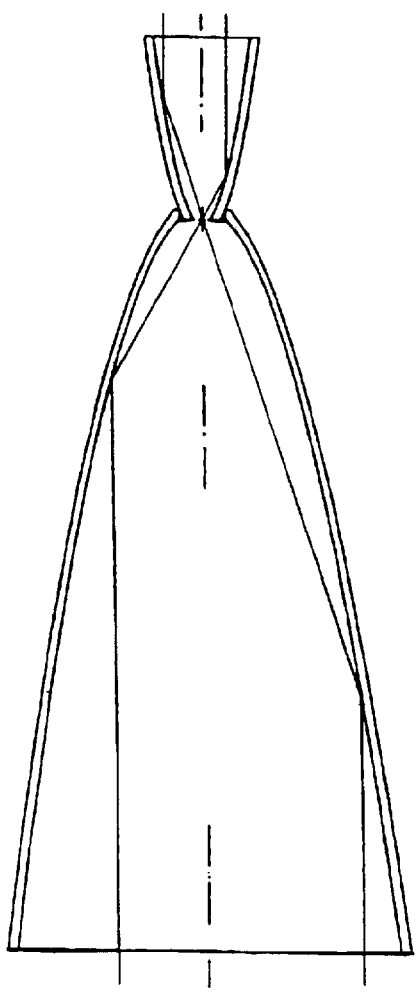
FIG. 24 illustrates a device of the present invention for changing the diameter of a collimated beam of light.

For various applications, it can be desirable to use light distributor tubes of different diameters and also to couple light sources or tubes transmitting natural sunlight to a blender box or to a light distributor tube of a different diameter. Since the efficiency of many light distributor tubes is directly related to the ability to provide collimated light, it is desirable to always provide collimated light. The device shown in FIG. 24 is utilized to change the diameter and concentration of a beam of collimated light. This device can advantageously either concentrate either a collimated light beam into a narrower beam or can expand a narrow beam into a wider beam of collimated light. The illustrated device comprises two parabolic reflectors which are arranged to have an identical focal point. In the manner illustrated, collimated light entering either side of the device which strikes a reflective surface on one side will pass through the common focal point, strike the reflective surface on the opposite side of the device and exit in a collimated beam.

Figure 25:
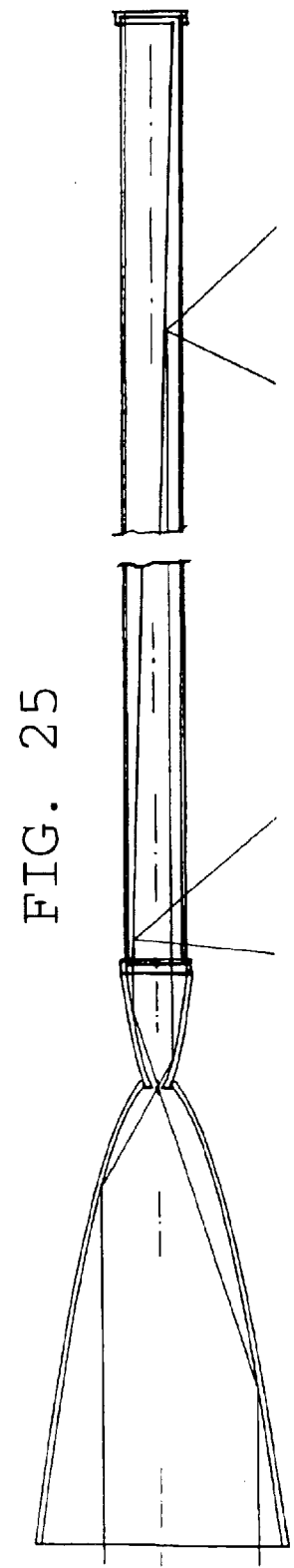
FIG. 25 illustrates the device of FIG. 24 connected to a light distributor tube.

FIG. 25 illustrates the use of this device wherein a wide beam of collimated light is first concentrated and then directed into a light distributor tube.

Figure 26:
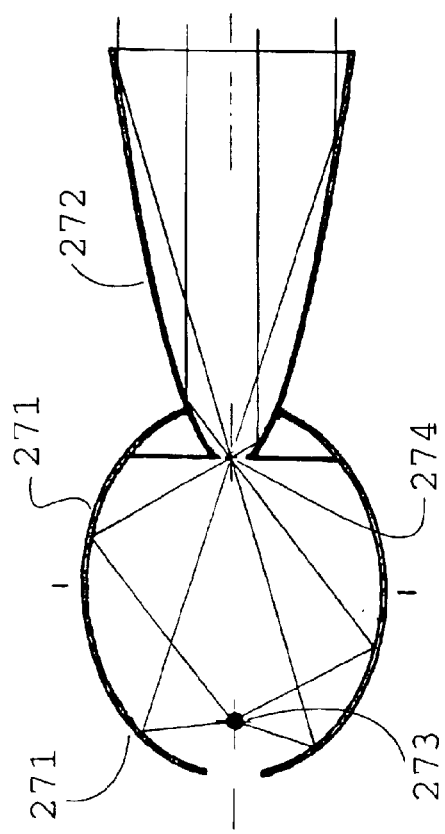
FIG. 26 is a cross-sectional diagramatic view of a device for collimating artificial light of the present invention.
Figure 27:
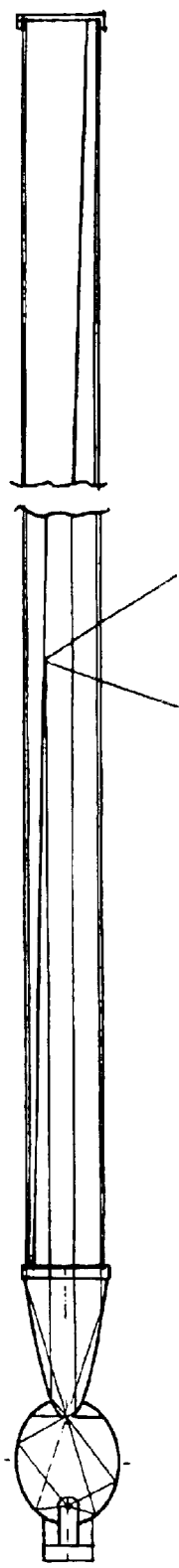
FIG. 27 illustrates the device of FIG. 26 connected to a light distributor tube.

FIG. 26 illustrates another device for collimating light from an artificial light source comprising an elliptical reflector 271 and a parabolical reflector 272. According to this embodiment of the present invention, the illuminated arc of the light source is positioned at the first focal point 273 of the elliptical reflector and the parabolical reflector is positioned such that its focal point is common with the second focal point 274 of the elliptical reflector. In the manner illustrated in FIG. 26, light emanating from the arc at the first focal point 273 which strikes the interior reflective surface of the elliptical reflector 271 passes through the second focal point 274 of the elliptical reflector/parabolical reflector, then strikes the interior surface of the parabolical reflector and exits as a collimated beam of light. FIG. 27 illustrates this improved artificial light source connected to a light distributor tube.

Figure 28:
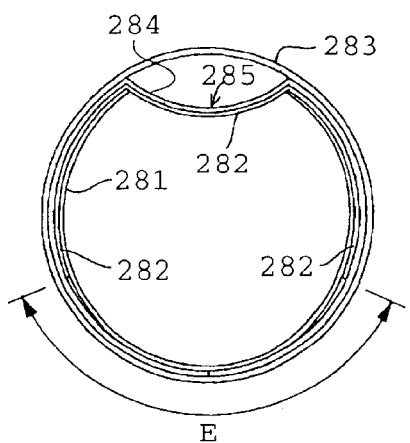
FIGS. 28 and 29 illustrate an embodiment of the present invention designed to eliminate areas of high intensity immediately proximate an artificial light source and to increase the amount of collimated light directed into a light distributor tube.
Figure 29:
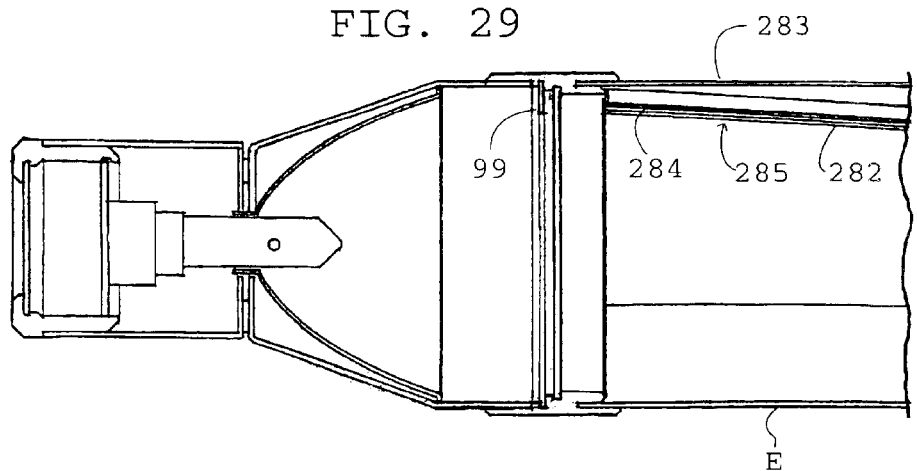

FIGS. 28 and 29 illustrate another aspect of the present invention which is designed to improve the even distribution of light from an artificial light source. When light is directed from a simple parabolic reflector such as the one shown in FIG. 29 connected to a light distributor tube, in the area immediately next to the light source, it is common to have intensity peaks. It has been found that a more even distribution of light emanating from the light distributor tube can be obtained by adding a mirror film 282 to the end of the light distributor tube proximate the artificial light source in the manner illustrated in cross-section in FIG. 28. This cross-sectional view of a light distributor tube section comprises a rigid polycarbonate clear tube 283. The mirror film 282 extends only from the point proximate D artificial light source or about 30 inches. The mirror film is bonded to a lexan suede film 284. In the same manner, beyond the mirror film, a 3M light enhancement film designated 3635-100, is bonded to the same lexan suede film 284. Distributor 285 is not covered with inner lexan HP92W film 281. Light is emitted from this distributor tube in the area designated by the arc E at the bottom of the tube. Light is emitted from this distributor tube in the area designated by the arc E at the bottom of the tube.

Figure 30:
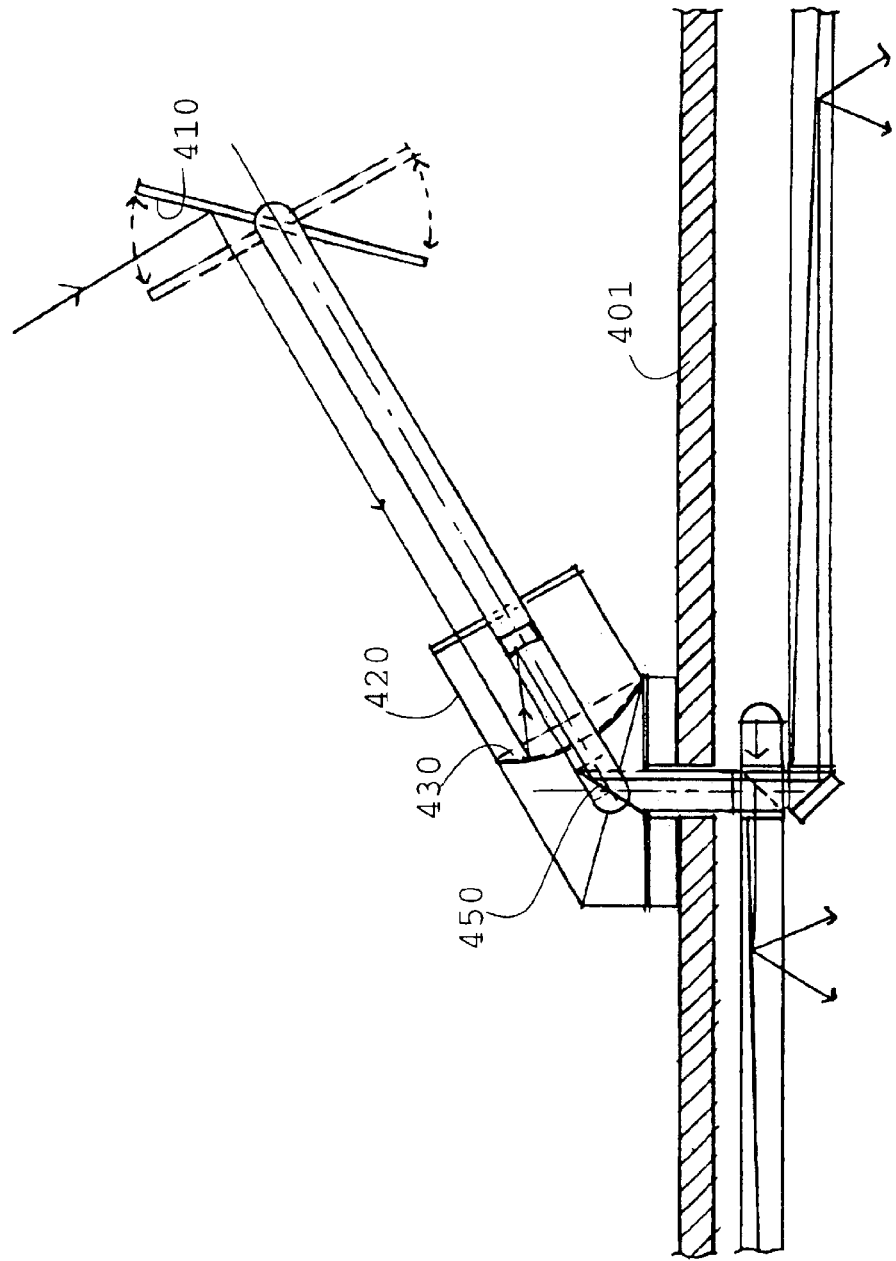
FIG. 30 illustrates another embodiment of the present invention.

FIG. 30 illustrates an alternative embodiment of the present invention wherein a flat reflector surface 410 is pivotally supported on a rotatable sunlight concentrator 420 comprising a parabolic reflector 430 which directs sunlight reflected off of flat reflector 410 onto a smaller parabolic reflector 440. Parabolic reflector 440 then reflects a concentrated, collimated beam of sunlight onto a reflector 450 which directs the concentrated, collimated beam of sunlight down through the roof 401 into a light blending device. In this illustrated embodiment, tilting reflector 410 preferably has a diameter equal to the diameter of large parabola 430 in horizontal dimension and 1.75 times the diameter of the large parabola 430 in vertical dimension in order to maximize the light collected from the sun.

Figure 31:
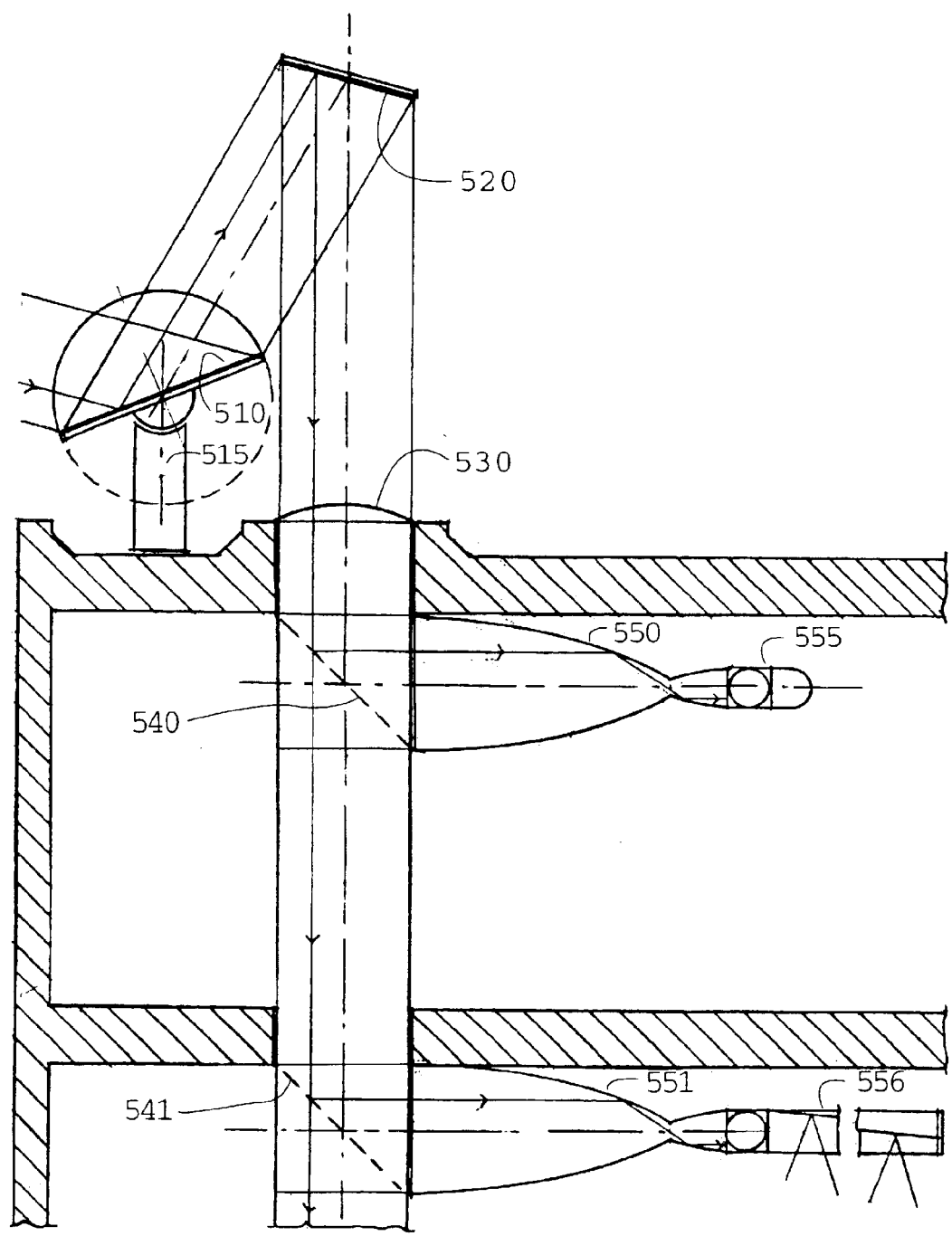
FIG. 31 illustrates another arrangement of the present invention.

FIG. 31 illustrates a simpler device wherein sunlight is reflected but is not concentrated. According to this simplified device, a planar reflector 510 which is supported for rotation in both the X and Y axis by support 515 reflects sunlight to a second planar reflector 510 which then simply directs the reflected beam of sunlight down through a skylight 530. The sunlight passes through beam splitters 540 and 541 and into beam concentrators 550, 551, respectively. Light concentrators 550 and 551 are of the general type shown above in FIGS. 24 and 25. The resulting concentrated light can then be blended with artificial light from an artificial light source 555 or can go directly to a light distributor tube 556.

Figure 32:
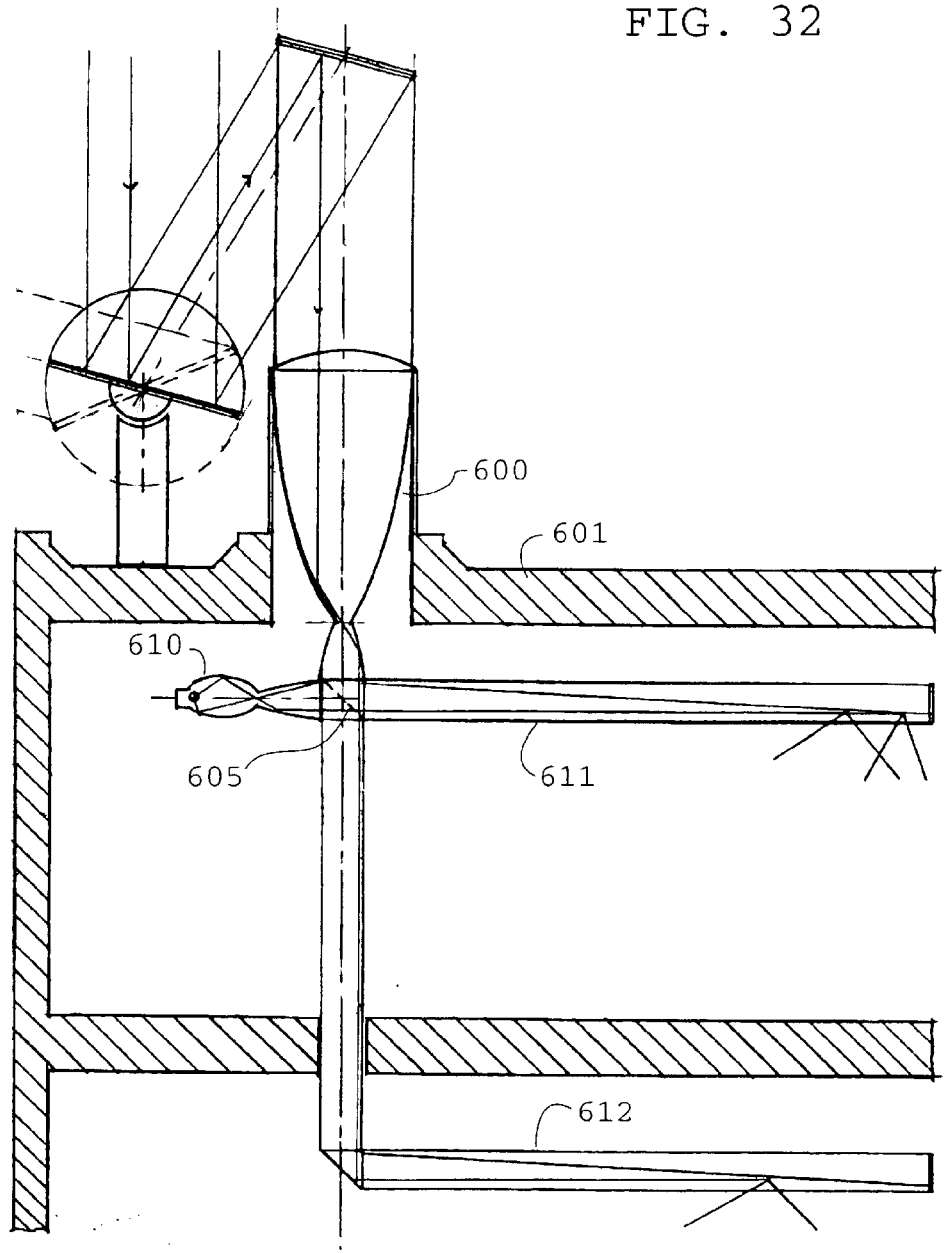
FIG. 32 illustrates still a further embodiment of the present invention.

FIG. 32 illustrates an alternative embodiment wherein the sunlight gathering device is similar to that shown in FIG. 31. However, according to this illustrated embodiment, the sunlight is concentrated using a device of the type shown in FIGS. 24 and 25. In this illustrated embodiment, the light concentrated device 600 is positioned in the roof 601 of the building. The concentrated beam of collimated sunlight is then directed into a blender box comprising a beam splitter 605 where the sunlight can be mixed with a collimated beam of artificial light emanating from artificial light source 610 and two resulting beams of combined natural and artificial light are distributed through distributor tubes 611 and 612. In this illustrated embodiment, the light distributor tubes are on different floors of the illustrated building. As noted above, light from the sun or the artificial light source(s) can be used singly, i.e. without the alternate source.

While the illustrated embodiments of the present invention show beams of sunlight passing generally vertically through the roof of a building, it is also within the scope of the present invention to pass sunlight through a roof on an angle. The embodiment of the present invention shown in FIG. 33 is similar to the embodiment shown in FIG. 30 wherein a pivotal and rotatable reflector 710 reflects light to a large parabolic reflector 730 and into a smaller parabolic reflector 740 which then sends the resulting collimated, concentrated beam of sunlight through the roof 701 on an angle into the building where it encounters reflector 750 and is then directed into either light distributor tubes or blender boxes for possible mixing with artificial light.

What is claimed:

1. A hybrid lighting system comprising:
   means for concentrating sunlight;
   a light distributor tube comprising two ends, a longitudinal axis and means for redirecting light entering an end of said tube out of said tube away from said longitudinal axis;
   means for directing concentrated sunlight into said light distributor tube; and
   means for aiming said sunlight concentrating means toward the sun, wherein said aiming means comprises at least two reflectors disposed on two relatively rotatable supports, wherein a first rotatable support is rotatable about a first axis and a second rotatable support is rotatable about a second axis which is perpendicular to said first axis.

2. A hybrid lighting system according to claim 1 comprising:
   a source of artificial light;
   means for directing artificial light into said light distributor tube.

3. A hybrid lighting system according to claim 2 wherein said artificial light directing means comprises a parabolic reflector.

4. A hybrid lighting system according to claim 2 wherein said artificial light directing means comprises a substantially elliptical reflector.

5. A hybrid lighting system according to claim 2 wherein said artificial light directing means comprises a parabolic reflector and a substantially elliptical reflector positioned to share a common focal point.

6. A hybrid lighting system according to claim 1 wherein said sunlight concentrating means comprises a first parabolic reflector having a focal point and a second parabolic reflector having a focal point which is smaller than the focal point of said first parabolic reflector, and wherein said reflectors have a common focal point.

7. A hybrid lighting system according to claim 6 wherein said sunlight concentrating means comprises a third parabolic reflector facing the same direction as said first parabolic reflector.

8. A hybrid lighting system according to claim 7 wherein said third parabolic reflector is connected to the back of said second parabolic reflector.

9. A hybrid lighting system according to claim 6 wherein concentrated, substantially collimated sunlight passes through a central opening in said first parabolic reflector.

10. A hybrid lighting system according to claim 2 comprising means for blending beams of sunlight with artificial light.

11. A hybrid lighting system according to claim 10 wherein said blending means comprises a beam splitter.

12. A hybrid lighting system according to claim 11 wherein said beam splitter comprises at least one dichroic coating.

13. A hybrid lighting system according to claim 11 wherein said beam splitter comprises a surface with a first portion covered by a reflective coating and a second portion not covered by the same reflective coating.

14. A hybrid lighting system according to claim 1 wherein said sunlight concentrating means recollimates said sunlight.

15. A hybrid lighting system according to claim 1 comprising a plurality of visible light beam splitters which reflect and transmit different percentages of visible sunlight.

16. A hybrid lighting system according to claim 15 comprising a plurality of visible light beam splitters which reflect and transmit different percentages of visible artificial light.

17. A device for blending sunlight and artificial light comprising:

an inlet for sunlight entering from a first direction;

an inlet for artificial light entering from a second direction, wherein said second direction is substantially perpendicular to said first direction;

a visible light beam splitter disposed at the intersection of said sunlight and said artificial light, wherein said beam splitter reflects substantially all of the visible light from a reflected portion of at least one of said sunlight or artificial light and transmits substantially all of the visible light from a non-reflected portion.

18. A device for blending sunlight and artificial light according to claim 17 wherein said visible light beam splitter reflects substantially all of the visible light from a portion of both of said sunlight and said artificial light.

19. A device for blending sunlight and artificial light according to claim 18 wherein said visible light beam splitter transmits substantially all of the visible light from a non-reflected portion of both of said sunlight and said artificial light.

20. A device for blending sunlight and artificial light according to claim 17 wherein said visible light beam splitter transmits substantially all of the visible light from a non-reflected portion of both of said sunlight and said artificial light.

21. A device for blending sunlight and artificial light according to claim 17 wherein said visible light beam splitter is positioned at a 45° angle to said first direction and said second direction.

22. A device for blending sunlight and artificial light according to claim 17 wherein said visible light beam splitter is positioned at a 45° angle to said first direction and said second direction.

23. A device for blending sunlight and artificial light according to claim 17 comprising a source of collimated artificial light.

24. A device for blending sunlight and artificial light according to claim 23 comprising a sunlight concentrator and collimator.

25. A device for blending sunlight and artificial light according to claim 17 comprising a sunlight concentrator and collimator.

26. A hybrid lighting system comprising:

means for collecting sunlight;

at least one source of artificial light;

at least one visible light beam splitter for splitting visible light into at least two visible light beams wherein substantially all of the visible light incident on a first portion of said visible light beam splitter is directed to a first visible light beam and substantially of the visible light incident on a second portion of said visible light beam splitter is directed to a second visible light beam; and at least one light distributor tube comprising two ends and means for directing light entering an end of said tube out a side of said tube wherein said sunlight and said artificial light are directed into said at least one distributor tube.

* * * * *